US011424979B2

(12) United States Patent
Lavi et al.

(10) Patent No.: US 11,424,979 B2
(45) Date of Patent: Aug. 23, 2022

(54) ONE CLICK MONITORS IN IMPACT TIME DETECTION FOR NOISE REDUCTION IN AT-SCALE MONITORING

(71) Applicant: Microsoft Technology Licensing, LLC, Redmond, WA (US)

(72) Inventors: Yaniv Lavi, Tel Aviv (IL); Rachel Lemberg, Herzliya (IL); Linoy Liat Barel, Tel Aviv (IL); Dor Bank, Tel Aviv (IL); Raphael Fettaya, Tel Aviv (IL); Ofri Kleinfeld, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/105,722

(22) Filed: Nov. 27, 2020

(65) Prior Publication Data

US 2022/0173961 A1    Jun. 2, 2022

(51) Int. Cl.
*G06F 15/16* (2006.01)
*H04L 41/0681* (2022.01)
*H04L 43/16* (2022.01)
*H04L 43/045* (2022.01)
*H04L 41/22* (2022.01)
(Continued)

(52) U.S. Cl.
CPC ........ *H04L 41/0681* (2013.01); *H04L 43/045* (2013.01); *H04L 43/16* (2013.01); *G06F 3/0481* (2013.01); *H04L 41/22* (2013.01); *H04L 67/10* (2013.01)

(58) Field of Classification Search
CPC ... H04L 41/0681; H04L 43/16; H04L 43/045; H04L 41/22
See application file for complete search history.

(56) References Cited

U.S. PATENT DOCUMENTS 9,817,884 B2    11/2017    Greifeneder et al.
10,148,540 B2   12/2018    Boubez
(Continued)

OTHER PUBLICATIONS

"DevOps Measurement: Proactive Failure Notification", Retrieved from: https://web.archive.org/web/20200228230007if_/https:/cloud.google.com/solutions/devops/devops-measurement-proactive-failure-notification, Feb. 27, 2020, 3 Pages.
(Continued)

*Primary Examiner* — Padma Mundur
(74) *Attorney, Agent, or Firm* — Jacob P. Rohwer; Newport IP, LLC

(57) ABSTRACT

Methods for one click monitors in impact time detection for noise reduction in at-scale monitoring are performed by systems and devices. The methods automatically configure time window sizes and numbers of consecutive time windows for optimally detecting system alerts in at-scale systems and per dimension combinations, including updating settings over time to adapt to changing system behaviors. The past behavior of system performance metrics are analyzed to match configuration options and determine a best fitting or optimal combination of a highest detection accuracy in lowest time to detect for alerting. Optimal monitoring configurations are determined for each of up to hundreds of thousands of the metric dimensions across the system, and an end user is enabled to apply the determined, optimal configurations for system monitoring with a single selection.

20 Claims, 8 Drawing Sheets

(51) Int. Cl.
*G06F 3/0481* (2022.01)
*H04L 67/10* (2022.01)

(56) References Cited

U.S. PATENT DOCUMENTS

| | | | |
|---|---|---|---|
| 10,534,658 B2 | 1/2020 | Li et al. | |
| 2002/0083169 A1* | 6/2002 | Aki | H04L 43/00 709/224 |
| 2014/0337506 A1* | 11/2014 | Sweeney | H04L 43/0823 709/224 |
| 2017/0149604 A1 | 5/2017 | Burford et al. | |
| 2017/0193395 A1* | 7/2017 | Limonad | G06N 20/00 |
| 2018/0091413 A1 | 3/2018 | Richards et al. | |
| 2018/0152338 A1 | 5/2018 | Panigrahi et al. | |
| 2019/0286509 A1 | 9/2019 | Baron et al. | |
| 2019/0340094 A1 | 11/2019 | Lu et al. | |
| 2019/0373007 A1 | 12/2019 | Salunke et al. | |

OTHER PUBLICATIONS

"How to Adjust the Sensitivity of Problem Detection", Retrieved from: https://web.archive.org/web/20200425192637/https://www.dynatrace.com/support/help/how-to-use-dynatrace/problem-detection-and-analysis/problem-detection/how-to-adjust-the-sensitivity-of-problem-detection/, Apr. 25, 2020, 3 Pages.

"Smart Alerts", Retrieved from: https://www.instana.com/docs/website_monitoring/smart_alerts/, Retrieved Date: Sep. 28, 2020, 7 Pages.

"International Search Report and Written Opinion Issued in PCT Application No. PCT/US2021/055334", dated Jan. 28, 2022, 11 Pages.

* cited by examiner

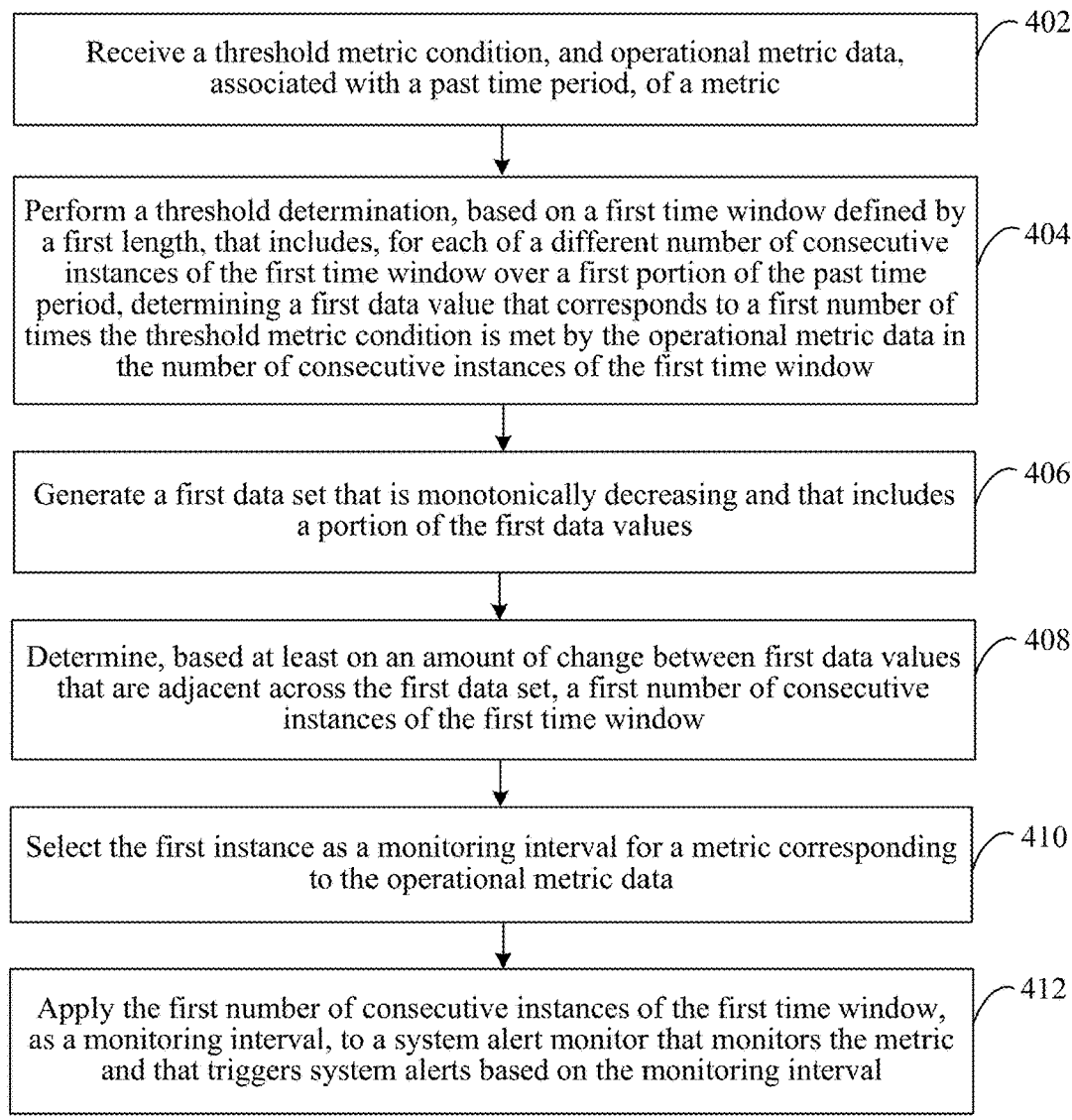

ONE CLICK MONITORS IN IMPACT TIME DETECTION FOR NOISE REDUCTION IN AT-SCALE MONITORING

BACKGROUND

When monitoring live systems, information technology (IT) personnel desire to be notified on meaningful system alerts, but also desire to receive such notifications in a minimal time to detect. One solution that reduces noise in detecting alerts is using larger aggregation time windows, or buckets, which smooth out the noise, yet this can cause long times to detect alerts and real incidents can also be smoothed out. When working with systems at scale, obtaining true detection with short times to detect is even more challenging as system monitors may have hundreds to hundreds of thousands of dimensions, and setting monitors based on the noisiest dimensions allows the monitor to fire unmeaningful alerts on other dimensions because the monitor must be set to a high sensitivity for noisy dimensions. End users are also required to tune monitors over time which only achieves an imperfect monitoring balance because of this issue. Current monitoring solutions require users to configure for themselves the settings they want the a system monitor to consider, such as time window length and time to detect, and do not offer any optimal or one-click selections of settings at scale to optimize noise handling and time to detect, much less over very high numbers of dimensions that require different monitoring settings.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods for one click monitors in impact time detection for noise reduction in at-scale monitoring are performed by systems and devices. The methods automatically configure time window sizes and numbers of consecutive time windows for optimally detecting system alerts in at-scale systems and per dimension combinations, including updating settings over time to adapt to changing system behaviors. The past behavior of system performance metrics are analyzed against a provided threshold value per metric to match configuration options and determine a best fitting or optimal combination of a highest detection accuracy in lowest time to detect for alerting. Noisy metrics are handled by varying numbers of consecutive time windows for metric monitoring, and times to detect are optimized by analyzing changes in threshold metric conditions being met across the different consecutive time windows. Optimal monitoring configurations are determined for each of up to hundreds of thousands of the metric dimensions across the system, and an end user is enabled to apply the determined, optimal configurations for system monitoring with a single selection.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 3 shows a flowchart for one click monitors in impact time detection for noise reduction in at-scale monitoring, in accordance with an example embodiment.

FIG. 4 shows a flowchart for one click monitors in impact time detection for noise reduction in at-scale monitoring, in accordance with an example embodiment.

FIG. 5A, FIG. 5B, FIG. 5C, and FIG. 5D each show a graphical representation of system metric data for one click monitors in impact time detection for noise reduction in at-scale monitoring, in accordance with an example embodiment.

Figure 6:
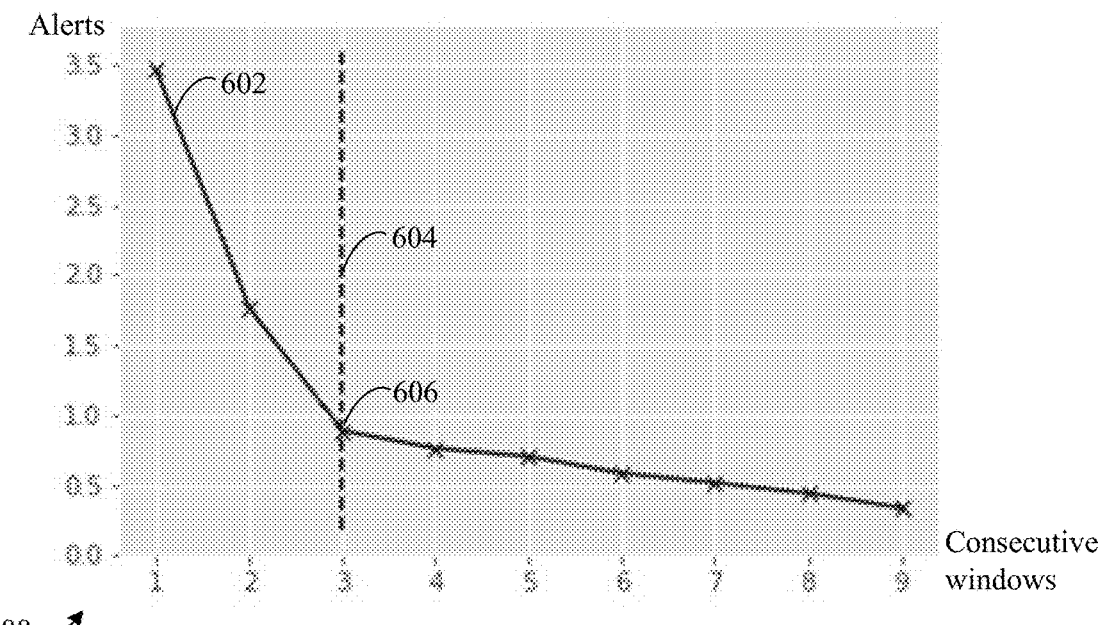

FIG. 6 shows a graphical representation of a monotonically decreasing data sets corresponding to a system metric for one click monitors in impact time detection for noise reduction in at-scale monitoring, in accordance with an example embodiment.

Figure 7:
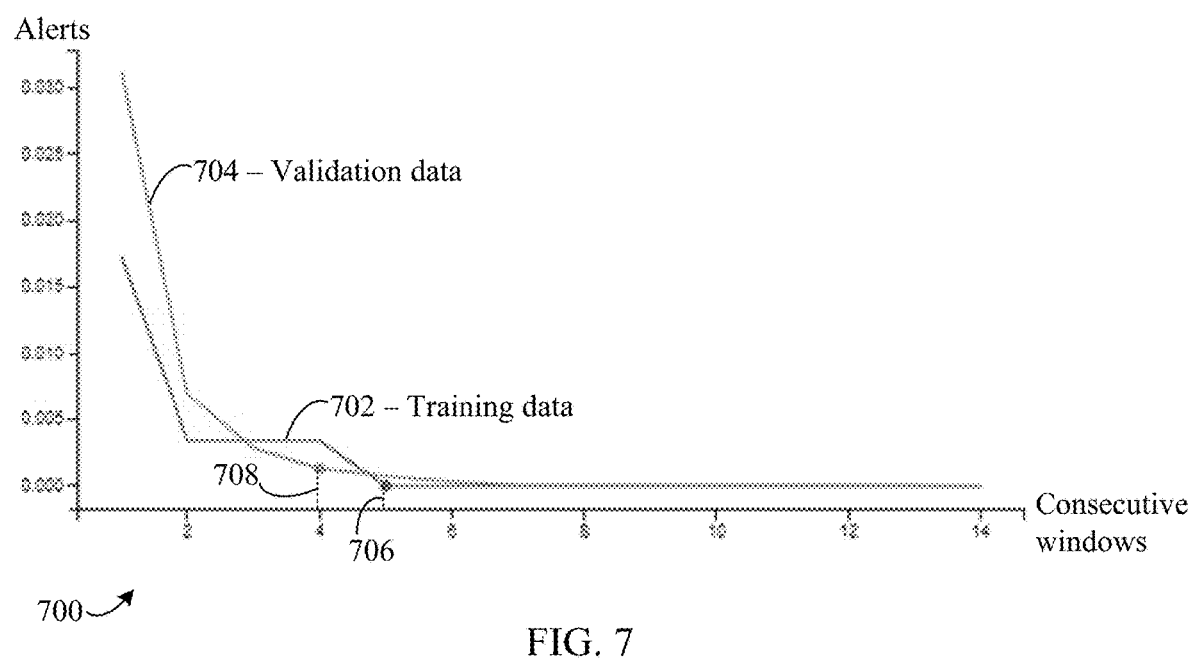

FIG. 7 shows a graphical representation of monotonically decreasing data sets corresponding to a system metric for one click monitors in impact time detection for noise reduction in at-scale monitoring, in accordance with an example embodiment.

Figure 8:
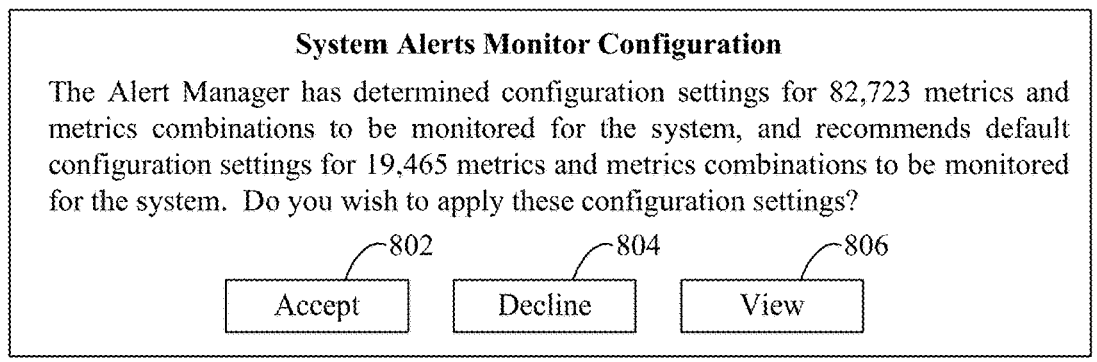

FIG. 8 shows a block diagram of a user interface for one click monitors in impact time detection for noise reduction in at-scale monitoring, in accordance with an example embodiment.

Figure 9:
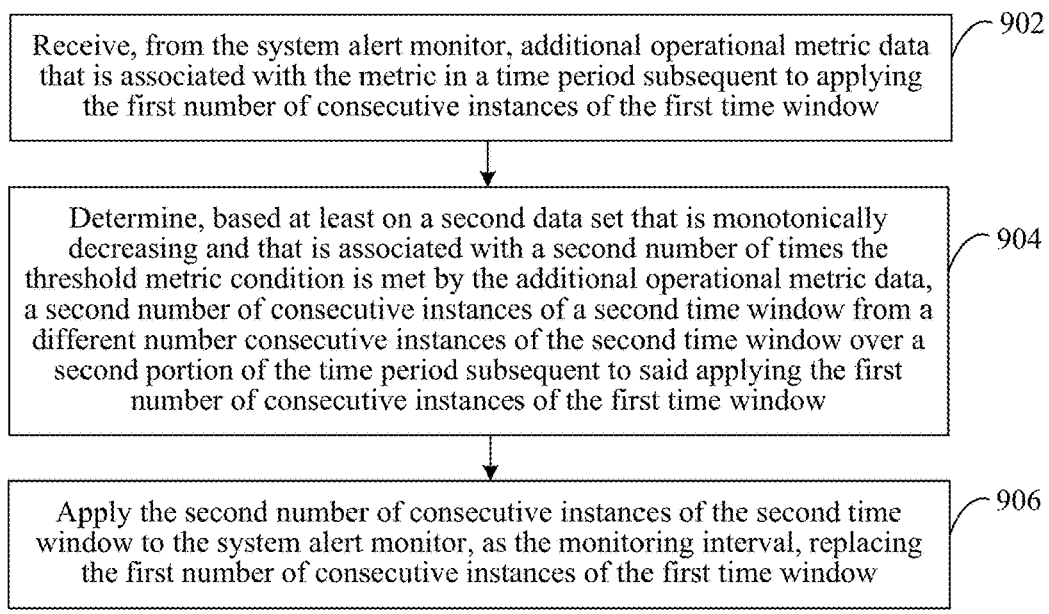

FIG. 9 shows a flowchart for one click monitors in impact time detection for noise reduction in at-scale monitoring, in accordance with an example embodiment.

Figure 10:
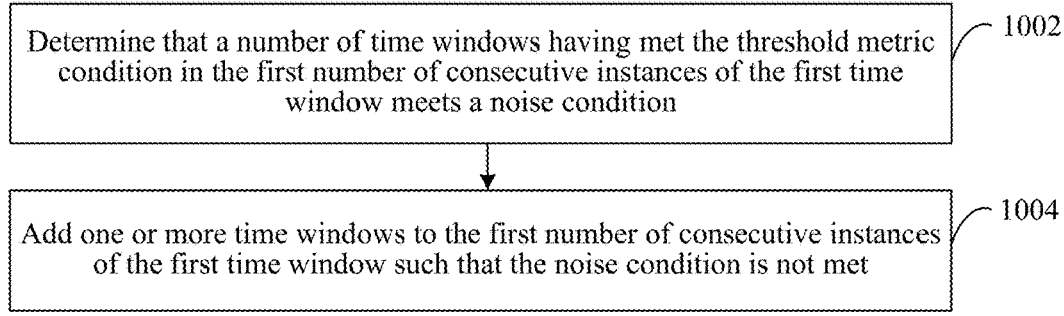

FIG. 10 shows a flowchart for one click monitors in impact time detection for noise reduction in at-scale monitoring, in accordance with an example embodiment.

Figure 11A:
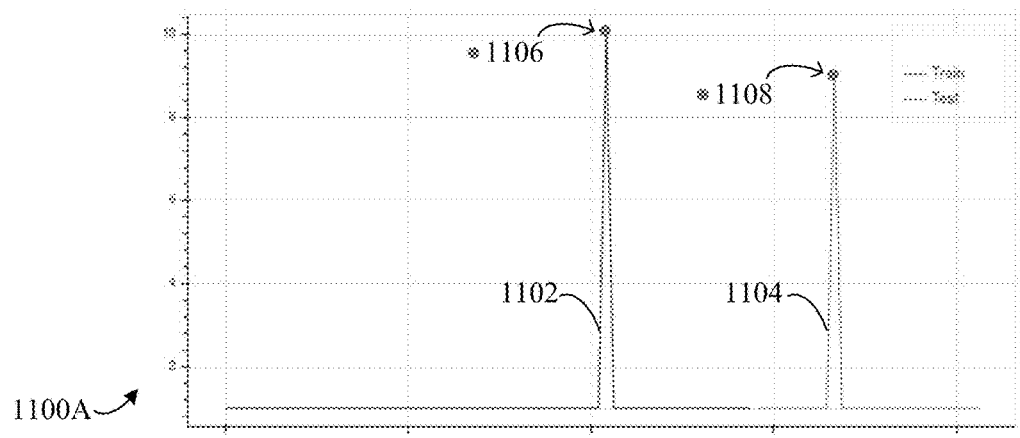
Figure 11B:
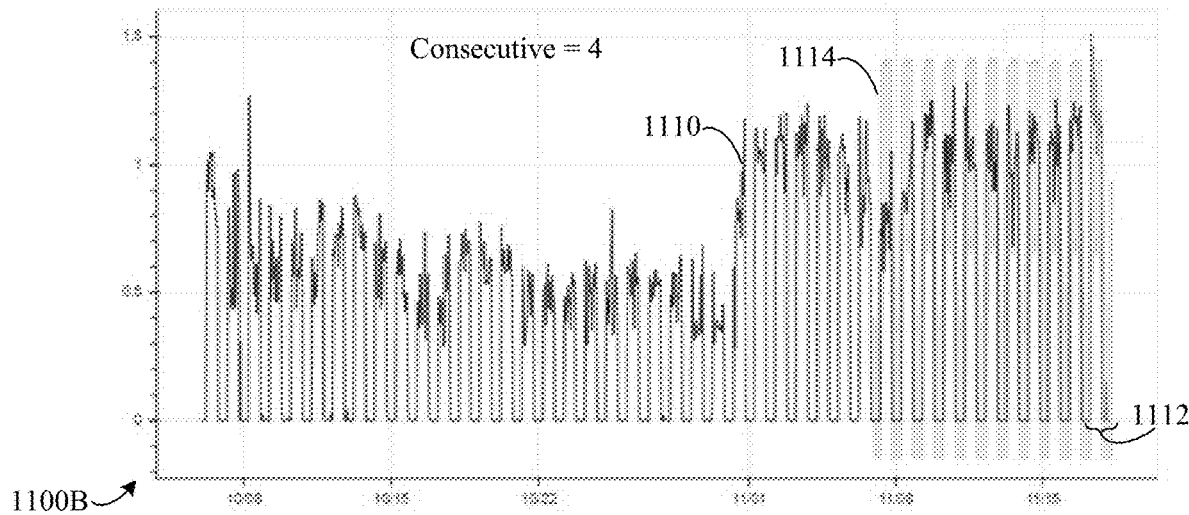
Figure 11C:
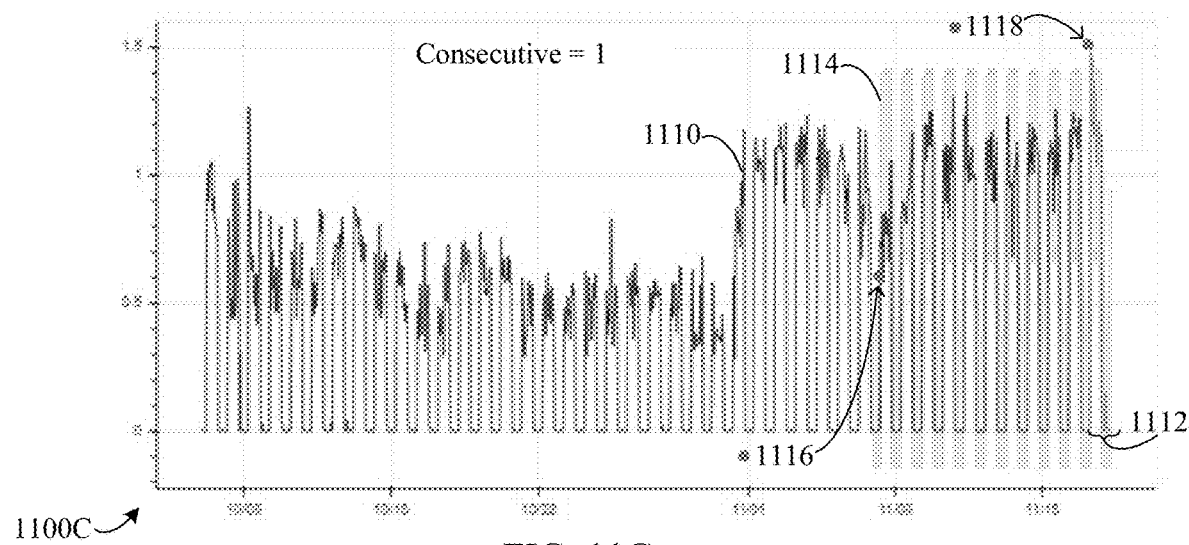

FIG. 11A, FIG. 11B, and FIG. 11C each show a graphical representation of system metric data for one click monitors in impact time detection for noise reduction in at-scale monitoring, in accordance with an example embodiment.

Figure 12:
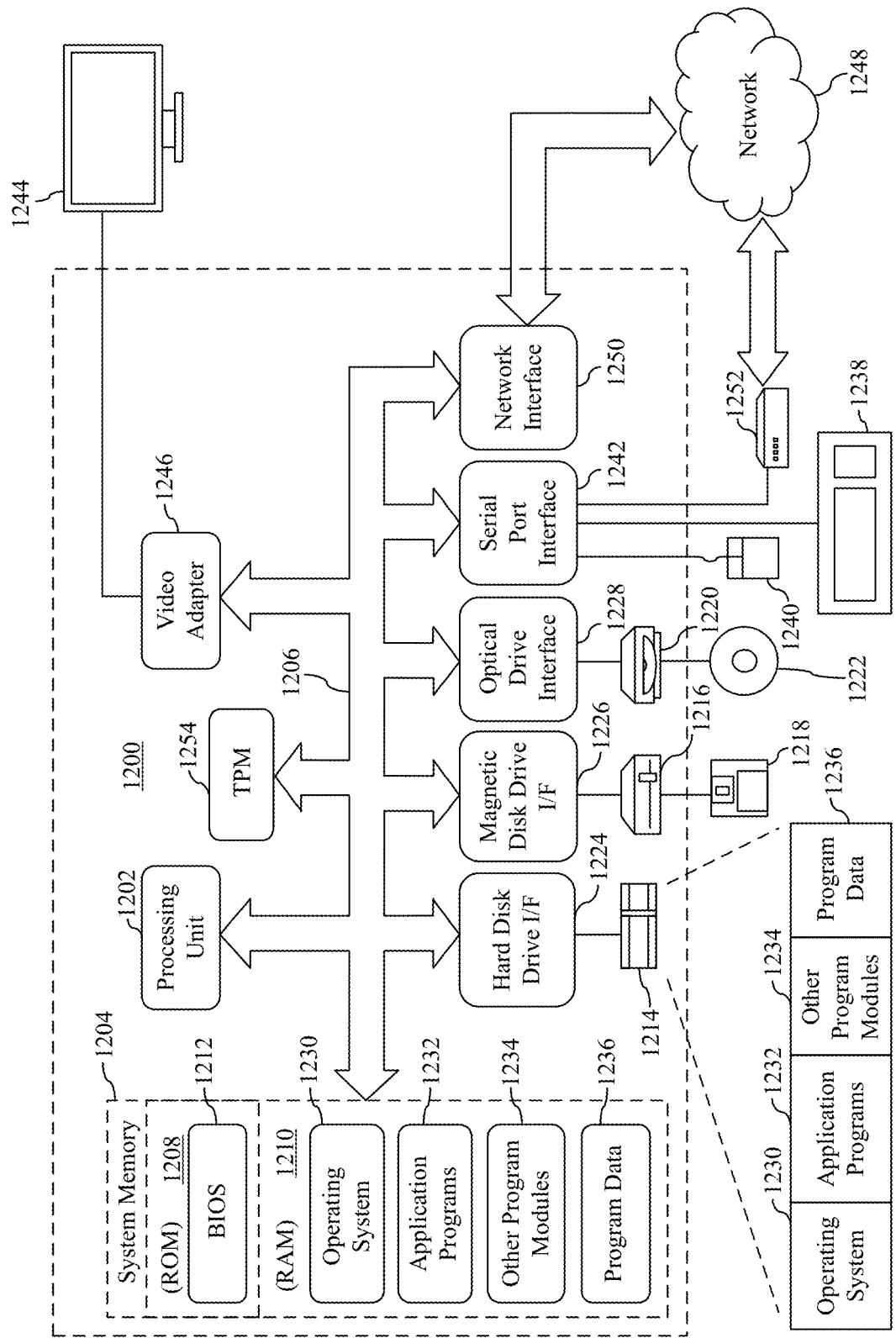

FIG. 12 shows a block diagram of an example computing device that may be used to implement embodiments.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner. Additionally, the drawings may not be provided to scale, and orientations or organization of elements of the drawings may vary in embodiments.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for one click monitors in impact time detection for noise reduction in at-scale monitoring. Section III below describes example computing device embodiments that may be used to implement features of the embodiments described herein. Section IV below describes additional examples and advantages, and Section V provides some concluding remarks.

II. Example Embodiments for One Click Monitors in Impact Time Detection for Noise Reduction in at-Scale Monitoring Times to detect alerts for computing system issues are important to reduce impacts on system performance and availability, while the ability to filter noisy system metrics and improves accuracy in triggering alerts is also important. In at-scale implementations, e.g., in cloud-based hosting of services and applications combinations of metrics required to be monitored for system alerts range in numbers up to hundreds of thousands or more, and end users are not capable of configuring so many individual settings. Embodiments for one click monitors in impact time detection for noise reduction in at-scale monitoring are provided herein.

For instance, a user is provided with a user interface (UI) having a selectable object or control by which the user is enabled to accept automatically generated configuration settings having parameters for managing system alert monitoring, in embodiments. The automatically generated configuration settings may include default options when operation data for monitored metrics is not yet available and/or may be options generated based on past system metric data that is analyzed according to models that optimize the accuracy of alert detection against reductions in times to detect conditions that trigger alerts. The described monitoring systems and operations therefor balance settings for lengths of time windows utilized for monitoring metrics and the numbers of consecutive time windows required to declare an alert—in other words, embodiments enable configurations to monitoring systems that are set to a desired meaningful impact time of a number of failures in a given, overall time period. In this way, information technology (IT) personnel are not burdened with false-positive and false-negative alerts while the time to detect system issues for any given metric or combination of metrics is maintained or reduced.

One example described herein is for consecutive time window settings, or a number of time windows in sequence, each having a given duration, in which a threshold metric condition for metric data must be met to trigger an alert. This parameter is applied in embodiments against different considerations. One such consideration is that the higher the value of consecutive threshold metric conditions being met, the more confidence is associated with a received alert for an incident that the problem is real and needs handling. For instance, while monitoring, if a threshold metric condition is met for central processing unit (CPU) utilization in each of four consecutive time windows, this provides more confidence that a real issue exists and that an alert should be triggered than if the same threshold metric condition is met for only one or two consecutive time windows. An opposing consideration, however, that when there is an actual problem, there is a need to notify IT personnel and/or the end user of the problem as soon as possible so that the impact of the issue on the system is minimal before the problem is resolved. This creates a tradeoff as on one hand early issues detection is valuable, while on the other hand, false alerts being triggered is also problematic. Additionally, monitoring configuration settings that allow for false alerts creates may lead to "alert storms," or many alerts firing for large/scaled-out services, which causes real problems to be lost in the noise as so many false alerts are triggered that the real problems cannot be seen and addressed.

Embodiments herein are model agnostic, and may be applied to various types of detections, including but not limited to, system alerts for resource utilization, network utilization, etc. In some examples contemplated herein, a system/device one click monitors in impact time detection for noise reduction in at-scale monitoring receives as inputs a threshold metric condition, also referred to as a border, and metric data. The threshold metric condition is a value or other condition against which metric data is compared to detect issues or operations outside of desired boundaries for system resources, etc., and the metric data may include actual testing or in-production data for a metric that is collected and stored, e.g., by the system alert monitor. In embodiments, threshold metric conditions, or boundaries, and metric data, are received as the inputs to an alert manager according to the described embodiments, and the alert manager outputs, for the system alert monitor, recommended time window durations and corresponding numbers of consecutive time windows that are determined as optimal based on the received inputs for various metrics to be monitored.

Embodiments are applicable to various types of models and are not envisioned as being limited to specific implementations, and machine learning (ML) models are contemplated herein for determinations of monitoring window duration and numbers of consecutive monitoring windows. ML models, various threshold metric conditions or borders for different metrics that are monitored may be generated by the system alert monitor and may be either static, simple values and/or may be dynamic thresholds/borders.

In embodiments, the alert manager receives data associated with the history of metric behavior. This metric data may be split into validation/testing data and training data. As a non-limiting example, metric data of a given metric is received from over a prior ten day period for determining monitoring window duration and number of consecutive monitoring windows. As another, for metric data of a given metric that is received from over a prior eleven day period, the last or most recent day may be used as a validation data portion, and the previous data as a training data portion, for determining monitoring window duration and number of consecutive monitoring windows. For one or more window durations/sizes (e.g., 5 minutes, 10 minutes, 15 minutes, 30 minutes, 60 minutes, etc.), an analysis is performed. This analysis includes calculating/determining an amount of noise per consecutive window in graphical or data set form on the training data with the given threshold metric condition. In embodiments, the noise may be characterized as the number of alerts that would occur for a given consecutive window setting in the training data, or as a ratio of alerting time windows to the total number of utilized consecutive monitoring time windows, using the threshold metric condition (e.g., a static border of CPU utilization being greater than, or greater than or equal to, 90%). As noted above, a dynamic threshold metric condition or border, such as via the Dynamic Threshold Service in Microsoft® Azure® from Microsoft Corporation of Redmond, Wash. An example of such a graphical/data set representation, and utilization thereof, is described below with respect to FIG. 5.

Next, the noise per consecutive window, in graphical or data set form, is calculated/determined on the validation data, in embodiments. Here, the noise is the number of alerts that would occur for a given consecutive window setting in the validation data using the same, or a different, threshold metric condition or border. In some embodiments, this validation data determination is performed only for ML-based models. The point of maximum curvature (or change in slope, or change in value) for each graph or data set over the consecutive window values is then determined as the optimal consecutive window value. In embodiments where noise per consecutive window graphs, or data sets, are determined for both training and validation data, the maximum among the two values is selected as the number of consecutive window instances or values. Some implementations also provide for increasing the number of consecutive window instances or values if the sixtieth percentile of the daily alert counts is greater than zero in order to insure that noise reduction is adequate for a given metric.

The above-described process may be performed for any number of metrics and metric combinations across a system, including very large numbers of monitored metrics in scaled-out cloud platforms.

Accordingly, methods for one click monitors in impact time detection for noise reduction in at-scale monitoring are performed by systems and devices. The embodiments herein provide solutions that improve times to detect and trigger alerts for system issues while also reducing and/or eliminating false positive and false negative alerts. These and other embodiments for one click monitors in impact time detection for noise reduction in at-scale monitoring will be described in further detail below in association with the Figures, and in the Sections/Subsections that follow.

Figure 1A:
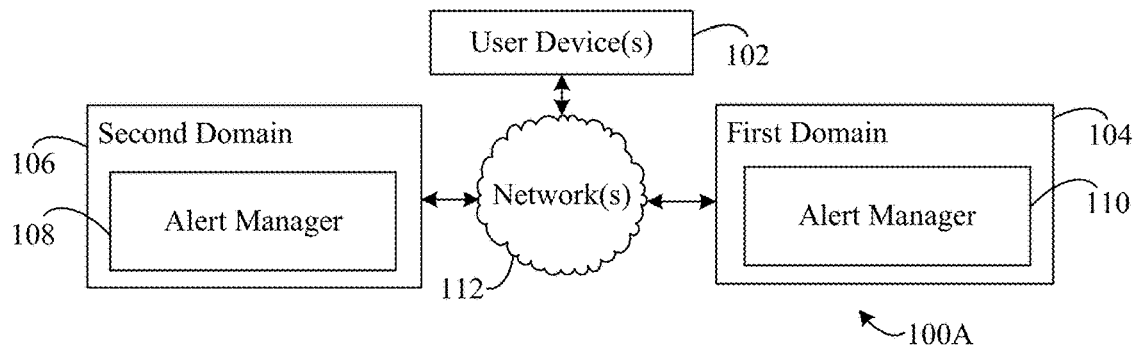
FIG. 1A shows a block diagram of a system for one click monitors in impact time detection for noise reduction in at-scale monitoring, according to an example embodiment.
Figure 1B:
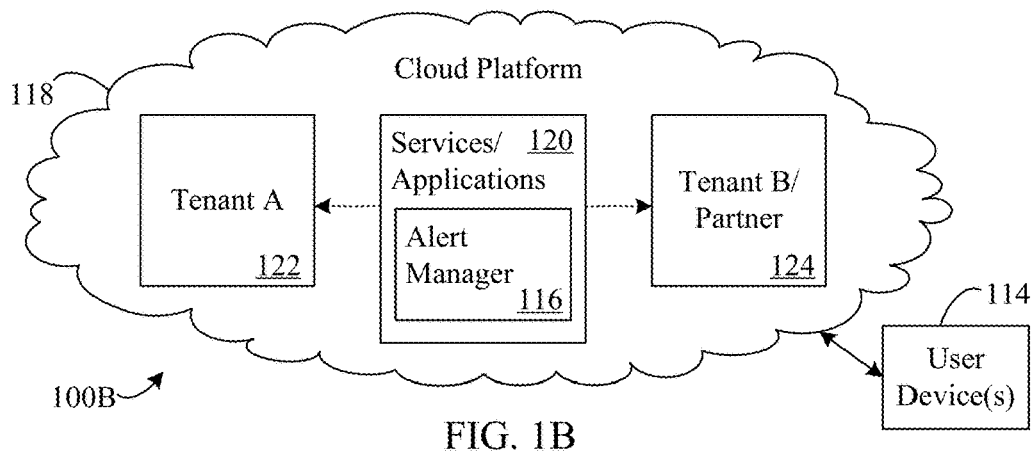
FIG. 1B shows a block diagram of a cloud-based system for one click monitors in impact time detection for noise reduction in at-scale monitoring, according to an example embodiment.

Systems, devices, and apparatuses may be configured in various ways for one click monitors in impact time detection for noise reduction in at-scale monitoring. For instance, FIG. 1A and FIG. 1B will now be described. FIG. 1A shows a block diagram of a system 100A, and FIG. 1B shows a block diagram of a cloud-based system 100B, each configured for one click monitors in impact time detection for noise reduction in at-scale monitoring.

As shown in FIG. 1A, system 100A includes user device(s) 102 (also user device 102 herein), a first domain host 104, and a second domain host 106. In embodiments, user) device 102, first domain host 104, and second domain host 106 communicate with each other over a network 112. It should be noted that in various embodiments different numbers of user devices, first domain hosts, and/or second domain hosts are present. Additionally, according to embodiments, any combination of the systems and/or components illustrated in FIG. 1A are present in system 100A.

Network 112 comprises different numbers and/or types of communication links that connect computing devices and hosts/servers such as, but not limited to, the Internet, wired or wireless networks and portions thereof, point-to-point connections, local area networks, enterprise networks, cloud networks, and/or the like, in embodiments. In an example, network 112 may be a cloud-based platform network and/or enterprise network through which at least one user device 102 connects to a domain or server thereof.

User device 102 in different embodiments is any number, type, or combination of computing devices or computing systems, including a terminal, a personal computer, a laptop computer, a tablet device, a smart phone, a personal digital assistant, a server(s), a gaming console, and/or the like, including internal/external storage devices, that are utilized to execute functions/operations described herein for one click monitors in impact time detection for noise reduction in at-scale monitoring, as well as for performing client-side functions/operations of client-server scenarios associated with embodiments such as receiving a UI for selection of a plurality of configurations for monitory system metrics via activation of a single UI control, element, object, etc., for end users, and/or receiving alert notifications from a system alert monitor for IT personnel. User device 102 also includes additional components (not shown for brevity and illustrative clarity) including, but not limited to, components and subcomponents of other devices and/or systems herein, in various embodiments.

A domain, as used herein, generally refers to a physical and/or logical system boundary under the control of an entity within which applications and/or services are hosted, offered, managed, and/or otherwise implemented, and also encompasses subdomains and/or the like in embodiments. Exemplary, non-limiting domains include, without limitation, web domains, tenancies of hosted cloud platforms, cloud service providers, enterprise systems, and/or any other type of network or system. A tenant is particular type of domain that is a representation of an organization in a cloud platform. The domain of the tenant in the cloud platform is its tenancy in which the tenant registers and manages applications, stores data/files, accesses services, etc.

First domain host 104 comprises one or more server computers or computing devices, such as an on-premises server(s) in addition to, or in lieu of, cloud-based servers, associated with a first domain. First domain host 104, as shown, includes an alert manager 108, which may be an instantiation of an alert manager described herein. Alert manager 108 is configured to determine numbers of consecutive instances of time windows that provide an optimal balance between generating accurate system alerts for respective system metrics and times to detect the system alerts, in embodiments. Alert manager 108 may also be configured to provide a UI in which a user is enabled to activate a single UI control, element, object, etc., that applies each of the determined numbers of consecutive instances of time windows to a system alert monitor, while in some embodiments, the UI may be provided by a system alert monitor of first domain host 104 (not shown).

Second domain host 106 comprises one or more server computers or computing devices, such as an on-premises server(s) in addition to, or in lieu of, cloud-based servers, associated with a second domain. Second domain host 106, as shown, includes an alert manager 110, which may be an instantiation of an alert manager described herein. Alert manager 110 is configured to determine numbers of consecutive instances of time windows that provide an optimal balance between generating accurate system alerts for respective system metrics and times to detect the system alerts, in embodiments. Alert manager 110 may also be configured to provide a UI in which a user is enabled to activate a single UI control, element, object, etc., that applies each of the determined consecutive instances of time windows to a system alert monitor, while in some embodiments, the UI may be provided by a system alert monitor of second domain host 106 (not shown).

Turning now to FIG. 1B, system 100B is a cloud-based embodiment of system 100A of FIG. 1A. As shown, system 100B includes a cloud platform 118. In embodiments, cloud platform 118 is a cloud-based platform such as Microsoft® Azure® from Microsoft Corporation of Redmond, Wash., that is accessible by a user(s) of user device(s) 114 (also user device 114 herein) over a network (not shown for illustrative clarity and brevity).

User device 114 may be any type and/or number of user device, such as devices similar to those described for user device 102 in FIG. 1A, and may correspond to end users and/or IT personnel with credentials for different domains, such as different tenancies within cloud platform 118.

A tenant is a representation of an organization in a cloud platform. The domain of the tenant in the cloud platform is its tenancy in which the tenant registers and manages applications, stores data/files, accesses services, etc., hosted by cloud platform 118. That is, tenants are enabled to provide applications/services, hosted by cloud platform 118, to users such as end users. In doing so, a tenant may lease or purchase the use of system resources within cloud platform 118 for such hosting and may monitor the system resources and/or operations.

For instance, cloud platform 118 includes a tenant A 122 and a tenant B/partner 124 (e.g., as a partner or service provider of the cloud platform owner), although different numbers of tenants are contemplated in embodiments. In embodiments, tenant A 122 corresponds to the first domain of system 100A, and tenant B/partner 124 corresponds to the second domain of system 100A. Users of user device(s) 114 having credentials for tenant A 122 are allowed to authenticate for this tenancy and access data, information, services, applications, etc., e.g., services/applications 120 (also "services/apps" 120 herein) of cloud platform 118, allowed or instantiated for tenant A 122. Likewise, users of user device(s) 114 having credentials for tenant B/partner 124 are allowed to authenticate for this tenancy and access data, information, services, applications, etc., e.g., services/apps 120 of cloud platform 118, allowed or instantiated for tenant B/partner 124.

Services/applications 120 is shown as including an alert manager 116, which may be an instantiation of an alert manager described herein. Alert manager 116 is configured to determine numbers of consecutive instances of time windows that provide an optimal balance between generating accurate system alerts for respective system metrics and times to detect the system alerts, in embodiments. Alert manager 116 may also be configured to provide a UI in which a user, e.g., a member of a tenancy and user of user device 114, is enabled to activate a single UI control, element, object, etc., that applies each of the determined consecutive instances of time windows to a system alert monitor, while in some embodiments, the UI may be provided by a system alert monitor of cloud platform 118, e.g., as a part of services/applications 120 (not shown).

Cloud platform 118 includes one or more distributed or "cloud-based" servers, in embodiments. That is, cloud platform 118 is a network, or "cloud," implementation for applications and/or services in a network architecture/cloud platform. A cloud platform includes a networked set of computing resources, including servers, routers, etc., that are configurable, shareable, provide data security, and are accessible over a network such as the Internet, according to embodiments. Cloud applications/services are configured to run on these computing resources, often atop operating systems that run on the resources, for entities that access the applications/services, locally and/or over the network. A cloud platform such as cloud platform 118 is configured to support multi-tenancy as noted above, where cloud platform-based software services multiple tenants, with each tenant including one or more users who share common access to certain software services and applications of cloud platform 118, as noted herein. Furthermore, a cloud platform is configured to support hypervisors implemented as hardware, software, and/or firmware that run virtual machines (emulated computer systems, including operating systems) for tenants. A hypervisor presents a virtual operating platform for tenants.

Portions of FIGS. 1A and 1B, and system 100A and system 100B respectively, such as first domain host 104, second domain host 106, and/or cloud platform 118 also include additional components (not shown for brevity and illustrative clarity) including, but not limited to, components and subcomponents of other devices and/or systems herein, e.g., an operating system, as shown in FIG. 12 described below, in embodiments.

Additionally, as would be understood by persons of skill in the relevant art(s) having the benefit of this disclosure, system 100A and system 100B illustrate embodiments in which system resources may be scaled out on demand or as needed, and the embodiments herein provide for determining and feasibly enabling configuration settings for system alert monitors in such scaled-out systems, even to the extent of many thousands of system metrics requiring alert monitoring configurations.

Systems, devices, and apparatuses are configured in various ways for one click monitors in impact time detection for noise reduction in at-scale monitoring, in embodiments. For instance, FIGS. 2 and 3 will now be described in this context.

Figure 2:
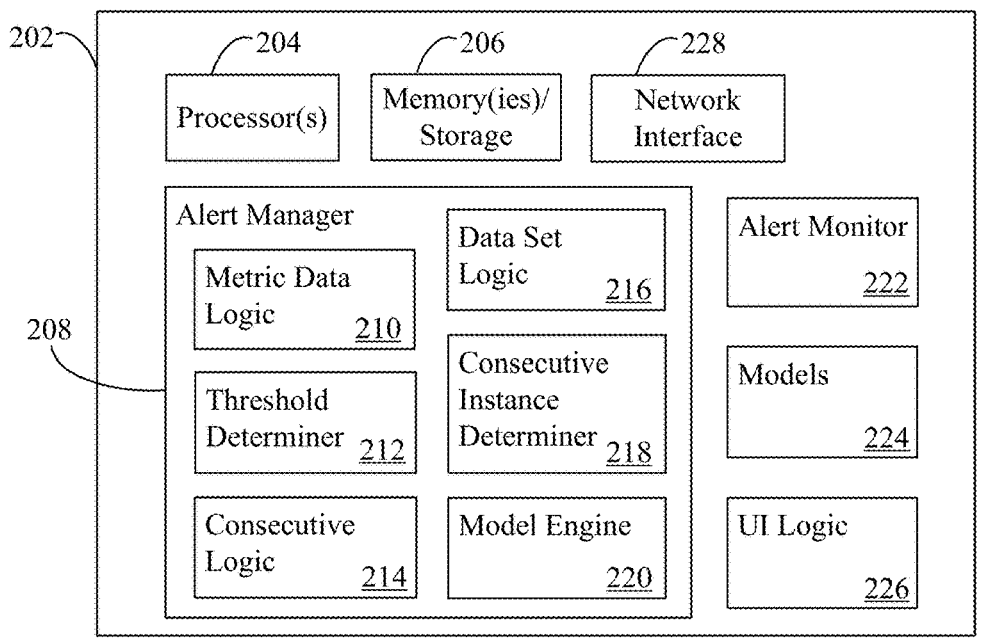
FIG. 2 shows a block diagram of a computing system configured for one click monitors in impact time detection for noise reduction in at-scale monitoring, according to an example embodiment.

Referring first to FIG. 2, a block diagram of a system 200 is shown for one click monitors in impact time detection for noise reduction in at-scale monitoring, according to an example embodiment. System 200 as exemplarily illustrated and described is configured to be an embodiment of system 100A of FIG. 1A and/or system 100B of FIG. 1B. FIG. 3 shows a flowchart 300 for one click monitors in impact time detection for noise reduction in at-scale monitoring, according to an example embodiment. System 200 may be configured to operate in accordance with flowchart 300. System 200 is described as follows.

System 200 includes a computing system 202 which is any type of server or computing system, as mentioned elsewhere herein, or as otherwise known, including without limitation cloud-based systems, on-premises servers, distributed network architectures, and/or the like. As shown in FIG. 2, computing system 202 includes one or more processors ("processor") 204, one or more of a memory and/or other physical storage device ("memory") 206, as well as one or more network interfaces ("network interface") 228. Computing system 202 also includes an alert manager 208 that is an embodiment of alert manager 108 and alert manager 110, and/or of alert manager 116, of FIGS. 1A and 1B, respectively, an alert monitor 222, models 224, and UI logic 226. It is contemplated herein that any components of system 200 may be grouped, combined, separated, etc., from any other components in various embodiments, and that the illustrated example of system 200 in FIG. 2 is non-limiting in its configuration and/or numbers of components, as well the exemplary arrangement thereof.

Processor 204 and memory 206 may respectively be any type of processor circuit(s)/system(s) and memory that is described herein, and/or as would be understood by a person of skill in the relevant art(s) having the benefit of this disclosure. Processor 204 and memory 206 may each respectively comprise one or more processors or memories, different types of processors or memories (e.g., at least one cache for query processing), remote processors or memories, and/or distributed processors or memories. Processor 204 may be multi-core processors configured to execute more than one processing thread concurrently. Processor 204 may comprise circuitry that is configured to execute and/or process computer program instructions such as, but not limited to, embodiments of alert manager 208, alert monitor 222, and/or UI logic 226, including one or more of the components thereof as described herein, which may be implemented as computer program instructions, as described herein. For example, in performance of/operation for flowchart 300 of FIG. 3, processor 204 may execute program instructions as described.

Memory 206 includes volatile storage portions such as a random access memory (RAM) and/or persistent storage portions such as hard drives, non-volatile RAM, and/or the like, to store or be configured to store computer program instructions/code for one click monitors in impact time detection for noise reduction in at-scale monitoring as described herein, as well as to store other information and data described in this disclosure including, without limitation, embodiments of alert manager 208, alert monitor 222, and/or UI logic 226, including one or more of the components thereof as described herein, and/or the like, in different embodiments. Memory 206 also includes storage of models 224, in embodiments, as well as metric data, data sets, determined and/or default configuration settings for monitoring windows, and/or the like, as described herein.

Network interface 228 may be any type or number of wired and/or wireless network adapter, modem, etc., configured to enable system 200, including computing system 202, to communicate intra-system with components thereof, as well as with other devices and/or systems over a network, such as communications between computing system 202 and other devices, systems, hosts, of system 100A in FIG. 1A and/or system 100B in FIG. 1B, over a network/cloud platform such as network 112 and/or cloud platform 118.

System 200 also includes additional components (not shown for brevity and illustrative clarity) including, but not limited to, components and subcomponents of other devices and/or systems herein, as well as those described below with respect to FIG. 12, e.g., an operating system, etc., according to embodiments.

Alert manager 208 of computing system 202 includes a plurality of components for performing the functions and operations described herein for one click monitors in impact time detection for noise reduction in at-scale monitoring, in embodiments. As illustrated, alert manager 208 includes metric data logic 210, a threshold determiner 212, consecutive logic 214, data set logic 216, a consecutive instance determiner 218, and a model engine 220, although additional components, as described herein or otherwise, are also included and some components may be excluded, in various embodiments. For example, model engine 220 may be a portion of alert manager 210 in some embodiments, or may be a separate component in other embodiments. Additionally, alert manager 208 may comprise a portion of alert monitor 222 in embodiments.

Metric data logic 210 is configured to receive metric data associated with performance of a computing system, e.g., a server or group of servers, a cloud platform, and/or the like. Metric data may be received from a system alert monitor such as alert monitor 222, or from any other type of system monitor. Metric data may be received in real time by metric data logic 210, or may be received in batches from stored metric data. Metric data logic 210 is configured to identify and/or group portions of received metric data for training models (i.e., training data) and for validating models (i.e., testing/validation data). In embodiments, metric data logic 210 may be configured to receive threshold metric conditions, e.g., as set by a user or dynamically generated, for one or more metrics.

Threshold determiner 212 is configured to determine if a threshold metric condition is met during the training of a model, in embodiments. For example, threshold determiner 212 determines when received metric data meets the threshold metric condition. Additional details regarding the determination of threshold metric conditions being met are described below. In embodiments, threshold determiner 212 may be configured to receive threshold metric conditions, e.g., as set by a user or dynamically generated, for one or more metrics.

Consecutive logic 214 is configured to provide different combinations of durations of monitoring windows and numbers of consecutive monitoring windows in the determination of configuration settings. Consecutive logic 214 may generate such combinations based on preferred or predetermined duration options and/or numbers of consecutives. As an example, a given type of metric may typically be monitored with a 5 minute time window, and consecutive logic 214 may use this duration to generate a plurality of consecutive monitoring window combinations with each window having a 5 minute duration. In some cases, noisy metrics may have combinations of durations and numbers of consecutives generated by consecutive logic 214 with longer durations, and may provide for more stable (i.e., less noisy) metrics combinations with shorter durations. However, embodiments are not so limited, and consecutive logic 214 is configured to provide any duration and number of consecutives combinations for any metric. Consecutive logic 214 generates combinations for training data and/or for validation data, according to embodiments.

Data set logic 216 is configured to generate data sets associated with threshold metric conditions met over the different combinations of durations of monitoring windows and numbers of consecutive monitoring windows provided by consecutive logic 214. Data sets may be represented as monotonically decreasing sequences of data points, and/or may be represented graphically as shown in FIG. 5. Embodiments herein are not limited by the representations generated by data set logic 216, and any equivalent representation of a given set of data are contemplated in this disclosure.

Consecutive instance determiner 218 is configured to select an optimal number of consecutive instances of a time window for a combination of a duration for a monitoring window and a number of consecutive monitoring windows for metrics to be monitored. For example, consecutive instance determiner 218 selects a combination based on an amount of change between adjacent data values that across a data set for a metric, in embodiments. An optimal configuration setting for to the determined/selected consecutive instance may correspond to an amount of change between two of the adjacent data values where the reduction in threshold metric conditions met for a number of consecutive windows (i.e., a reduction in the alert to consecutive ratio) decreases by a relative or predetermined amount. In a graphical context, this optimal configuration setting can be illustrated as the point where the slope of the monotonically decreasing graph begins to flatten, becomes less negative, or becomes closer to zero. In other embodiments, consecutive instance determiner 218 selects a combination derived from the initially determined optimal setting based on a maximum number of determined alerts allowed or desired in a given time while minimizing a time to detect (e.g., a number of consecutive monitoring windows determined). Additional considerations for the maximum number of determined alerts may include, e.g., a portion of days, from a number of days, in which no alerts would be triggered (e.g., in cases of noisy metrics), while other measures of time, in addition to or in lieu of days, are also contemplated.

In embodiments, as noted above, the automatically generated configuration settings provided by alert manager 208 may include default options when operation data for monitored metrics is not yet available. In an example, a given type of metric may typically be monitored with a time window of a certain duration and with a certain number of consecutive monitoring windows (e.g., a time window duration of 5 minutes and 4 consecutive monitoring windows), which may be initially selected and applied as default configuration settings for a system alert monitor. Additionally, in some embodiments, default configuration settings may be applied based on other determined configuration settings for the same or similar system metrics in similar contexts. As a non-limiting example, an application or service hosted at a cloud platform for a tenant may be determined as requiring a specific configuration setting for monitoring CPU utilization, and another tenant may also have the same application hosted and expect similar usage; in such a case, the same configuration setting for monitoring CPU utilization may be set as a default configuration setting for the other tenant. These default configuration settings may be subsequently updated based on operation metric data either with, or without, user input or acceptance.

Model engine 220 is configured to generate and apply models via the components of alert manager 208 described above in order to determine configuration settings for monitoring system metrics. In embodiments, model engine 220 comprises a ML engine that generates and applies ML models. Models are generated and/or validated using system metric data, as described herein, such as past metric data that is not used for testing and/or validation of models.

Models 224 includes one or more models, in embodiments, utilized by alert manager 208 to determine configuration settings such as durations of monitoring windows and numbers of consecutive monitoring windows for monitoring system metrics. Models 224 may be generated by model engine 220, and may comprise ML models as well as other types of models, and may be stored as part of memories 206. Various ones of models 224 are directed to different types of system metrics, in embodiments, and within types of metrics that are monitored, different models may be applied. As an example, a first model may be utilized for determining configuration settings for CPU utilization of a first service for a tenant of a cloud platform, while a different second model may be utilized for determining configuration settings for CPU utilization of a second service for the tenant. In other words, it is contemplated herein any specific contexts/implementations for the same metric may require different configuration settings for alert monitoring based on expected utilization, user preferences, scale of implementations, etc.

Turning also now to FIG. 3, flowchart 300 begins with step 302. In step 302, numbers of consecutive instances of time windows that provide an optimal balance between generating accurate system alerts for respective system metrics and times to detect the system alerts are determined. For example, alert manager 208 as described above is configured to perform step 302 of flowchart 300. That is, alert manager 208 is configured to determine respective configuration settings, for monitoring any number of system metrics, which provide for an optimal selection of both alert triggering accuracy and low times to detect for individual system metrics, regardless of their number. In other words, alert manager 208 provides for determinations of specific numbers of consecutive instances of a time window duration with a number of consecutive monitoring windows for individual system metric contexts, including for a same system metric that is monitored different scenarios, e.g., different applications, services, expected utilizations, and/or the like.

Referring again to system 200 in FIG. 2, UI logic 226 is configured to generate a UI for presentation to a user by which default and/or recommended configuration settings such as durations of monitoring windows and numbers of consecutive monitoring windows may be accepted/selected by a user of a user device via a single control, object, element, etc., of the UI. UI logic 226 may be configured to provide the UI for presentation to the user via network interface 228. UI logic 226 is also configured to generate similar UIs for dynamic updating of configuration settings, after initial configuration settings are applied, via a single user selectable option, in embodiments. In some implementations, UI logic 226 comprises a portion of alert manager 208 and/or alert monitor 222.

Flowchart 300 of FIG. 3 continues with step 304. In step 304, a user interface is provided in which a user is enabled to activate a single user interface control that applies each of the determined numbers of consecutive instances of time windows to a system alert monitor. For example, UI logic 226 is configured to generate and provide a UI to a user that enables a one-click selection of determined configuration settings for any number of system metrics to be monitored.

Accordingly, the embodiments herein provide for a user to be enabled to quickly, and feasibly, select any number of optimized configuration settings for system metrics via a single selection.

Again with respect to system 200 of FIG. 2, alert monitor 222 is configured to monitor system operations and functions for various system metrics, including combinations thereof, and to provide alerts for monitored system metrics when alerting conditions described herein are reached. For example, and without limitation, alert monitor 222 may be configured to monitor system metrics such as CPU utilization for physical processors and/or virtual machines, memory load, virtual memory, network traffic load, types of network traffic, temperature, persistent storage accesses, persistent storage volumes, other input/output (I/O) accesses, and/or the like. Alert monitor 222 is configured to receive configuration settings for monitoring metrics and combinations of metrics from alert manager 208, where the configuration settings include durations of monitoring windows and numbers of consecutive monitoring windows to be used for triggering alerts. Alerts for met altering conditions may be provided as messages, etc., to IT personnel of user devices as described herein over a network.

As noted above for FIGS. 1A, 1B, and 2, embodiments herein provide for one click monitors in impact time detection for noise reduction in at-scale monitoring. System 100A of FIG. 1A, system 100B of FIG. 1B, and/or system 200 of FIG. 2 may be configured to perform functions and operations for such embodiments. It is further contemplated that the systems and components described above are configurable to be combined in any way. FIG. 4, FIG. 5A, FIG. 5B, FIG. 5C, FIG. 5D, FIG. 6, and FIG. 7 will now be described.

FIG. 4 shows a flowchart 400 for one click monitors in impact time detection for noise reduction in at-scale monitoring, according to example embodiments. System 100A in FIG. 1A, System 100B in FIG. 1B, and/or system 200 in FIG. 2 are configured to operate according to flowchart 400, which is an embodiment of flowchart 300 of FIG. 3. Further structural and operational examples will be apparent to persons skilled in the relevant art(s) based on the following descriptions. Flowchart 400 is described below with respect to system 200 of FIG. 2, and with respect to FIG. 5A, FIG. 5B, FIG. 5C, FIG. 5D, FIG. 6, and FIG. 7.

FIG. 5A, FIG. 5B, FIG. 5C, FIG. 5D, each show a graphical representation of a system metric data (plot 500A, plot 500B, plot 500C, and plot 500D, respectively, of a metric data value over time), FIG. 6 shows a graphical representation of a monotonically decreasing data set corresponding to a system metric (data set 600 of alerts per consecutive monitoring windows), and FIG. 7 shows a graphical representation of monotonically decreasing data sets corresponding to a system metric for training data and validation data (data sets 700 of alerts per consecutive monitoring windows), according to example embodiments for one click monitors in impact time detection for noise reduction in at-scale monitoring.

Regarding FIG. 4, flowchart 400 begins with step 402. In step 402, a threshold metric condition and operational metric data, associated with a past time period, of a metric are received. For example, metric data logic 210 and/or threshold determiner 212 of alert manager 208 in system 200 of FIG. 2 are configured to receive a threshold metric condition and operational metric data associated with a past time period. This information may be received from a system alert monitor such as alert monitor 222 of system 200 in FIG. 2, from an internal or external data storage, from a dynamic threshold service, from a user, and/or the like, in different embodiments.

Figure 5A:
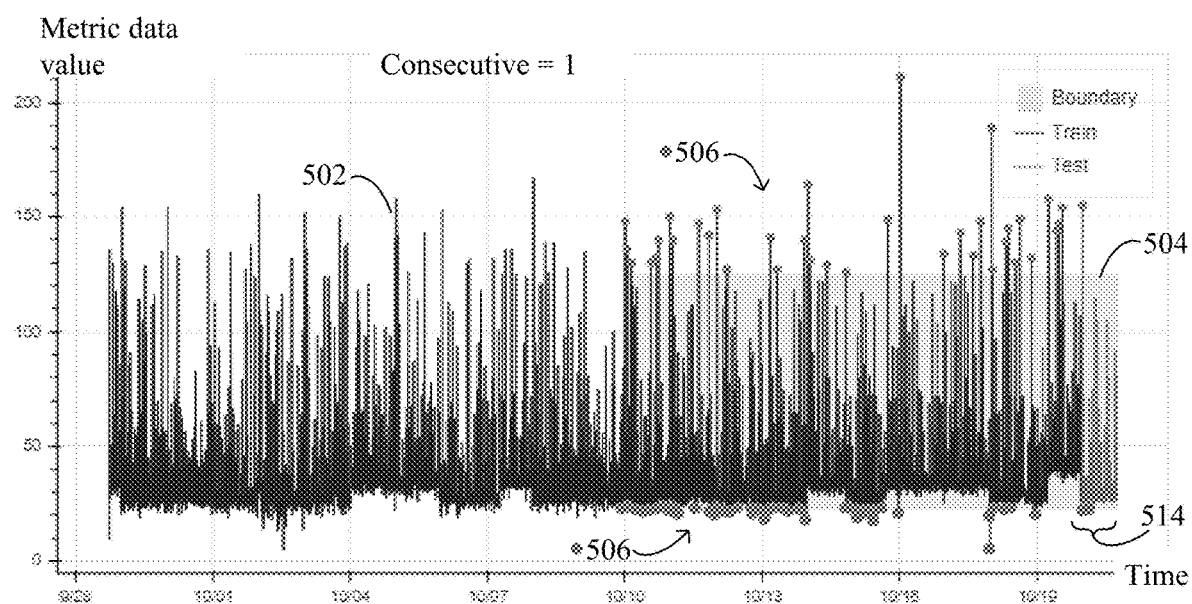
Figure 5B:
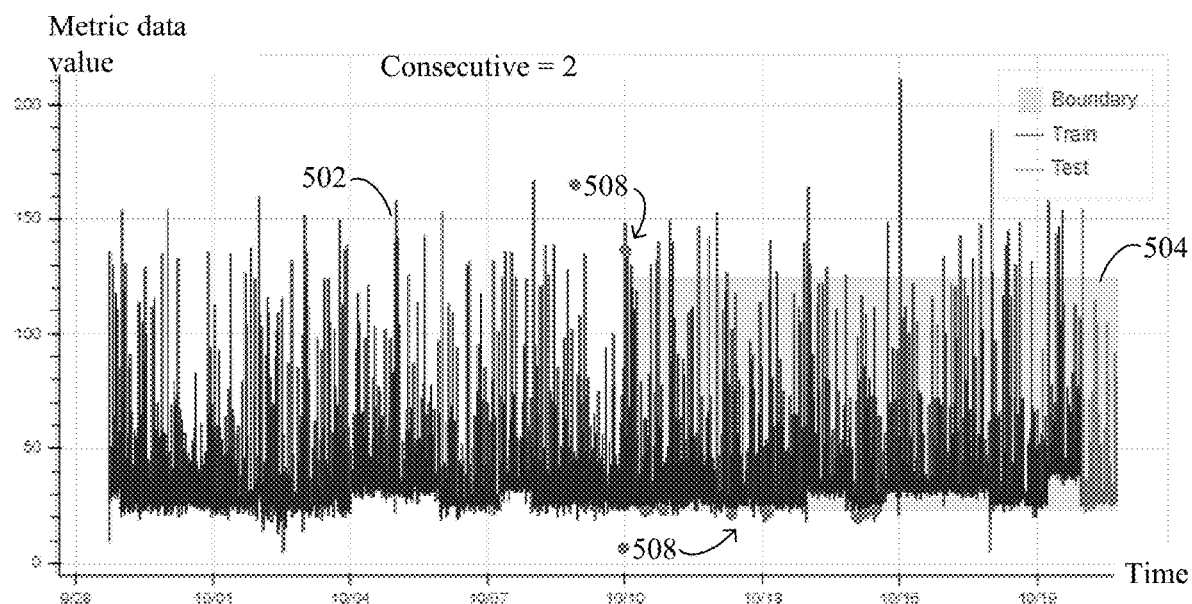
Figure 5C:
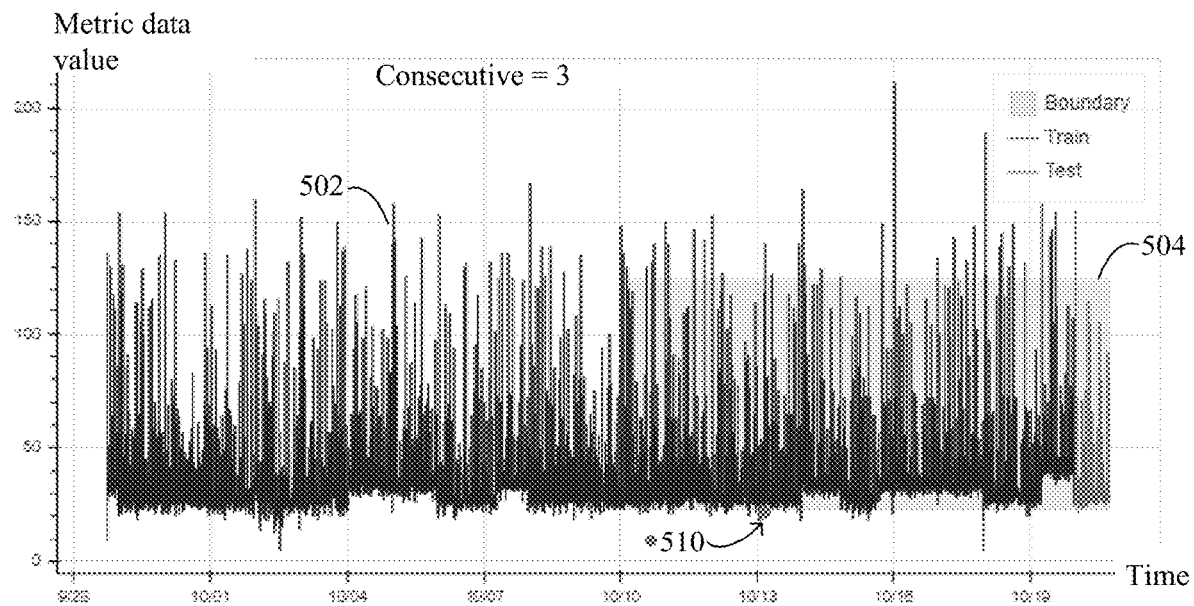
Figure 5D:
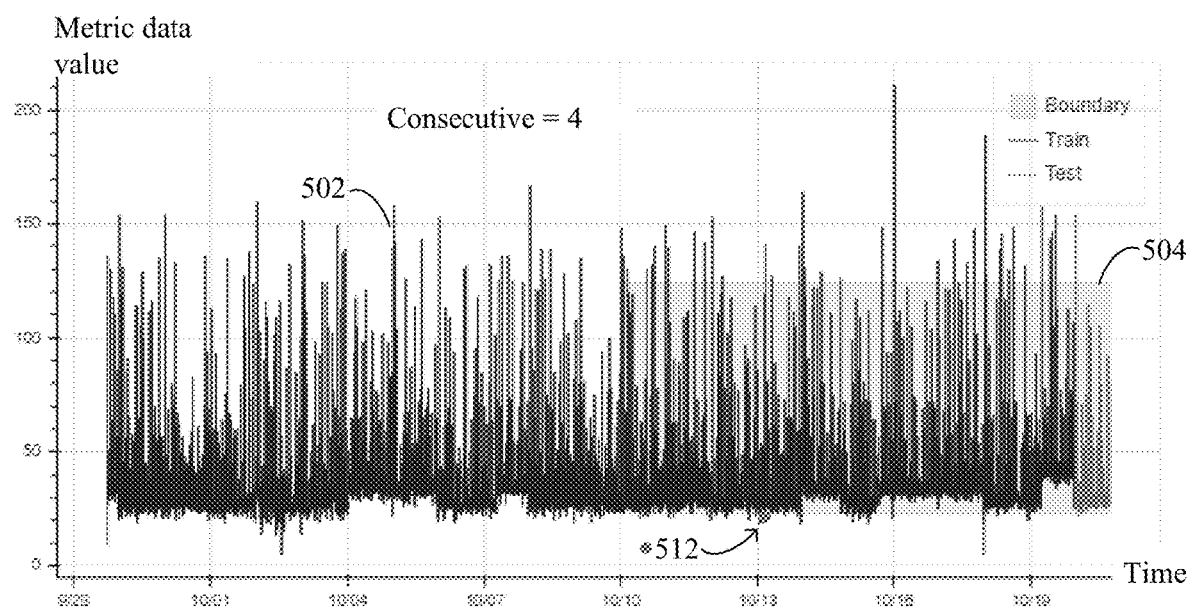

Referring also to FIGS. 5A-5B, in each of plot 500A, plot 500B, plot 500C, and plot 500D, operational metric data 502 of an example metric, and a threshold metric condition 504 (or a boundary 504) as a gray box, are shown. In embodiments, such operational metric data and a corresponding threshold metric condition are provided to alert manager 208 of system 200.

In step 404 of flowchart 400 in FIG. 4, a threshold determination is performed, based on a first time window defined by a first length, that includes, for each of a different number of consecutive instances of the first time window over a first portion of the past time period, determining a first data value that corresponds to a first number of times the threshold metric condition is met by the operational metric data in the number of consecutive instances of the first time window. For example, threshold determinations are performed by threshold determiner 212 of alert manager 208 in FIG. 2. As described herein, for a given time window having a duration, determinations are made as to how many times, or an average number of times as the data values in embodiments, a threshold metric condition is met by the operational metric data using different numbers of consecutive time windows (i.e., numbers of consecutive time windows) where the condition is met in each of the number of consecutive instances of the time window.

Referring again to FIGS. 5A-5B, plot 500A, plot 500B, plot 500C, and plot 500D, are illustrated as performing threshold determinations, with a time window duration of 5 minutes, over number of consecutive instances of the time window of 1 window, 2 windows, 3 windows, and 4 windows, respectively, for operational metric data 502 against threshold metric condition 504. Plot 500A shows total values 506 (as gray circles) for threshold metric condition 504 being met, which are many or noisy, given the number of consecutive instances of the time window of 1 window. Plot 500B shows total values 508 (as gray circles) for threshold metric condition 504 being met, which are still many or noisy but are lower in number than in plot 500A, given the number of consecutive instances of the time window of 2 windows. Plot 500C shows a total value 510 (as a gray circle) for threshold metric condition 504 being met, which is a single meeting of threshold metric condition 504, due to the number of consecutive instances of the time window of 3 windows being used. Likewise, plot 500D shows a total value 512 (as a gray circle) for threshold metric condition 504 being met, which is a single meeting of threshold metric condition 504, due to the number of consecutive instances of the time window of 4 windows being used. While not shown for brevity, additional iterations with increasing numbers of consecutive instances of the time window may also be performed, according to embodiments.

Referring back to FIG. 4, in step 406, a first data set is generated that is monotonically decreasing and that includes a portion of the first data values. For example, data set logic 216 of alert manager 208 in FIG. 2 is configured to generate monotonically decreasing data sets and/or graphical representations thereof, based on a portion or all of the data values determined in step 404 described above. As an example, each data value determined in step 404 may represent an average number of times per number of consecutive instances of the time windows that the threshold metric condition is met. Data set logic 216 generates a data set with data values corresponding to the number of consecutives.

Referring now to FIG. 6 and data set 600, graphically showing numbers alerts per each number of consecutive monitoring time windows, a monotonically decreasing data set representation 602 is illustrated as a curve fitting data values as would be generated for each number of consecutive instances of time windows in step 406 of flowchart 400.

As would be understood by persons of skill in the relevant art(s) having the benefit of this disclosure, embodiments also provide for performing step 404 and/or step 406 for one or more other time window durations such as, but not limited to, 10 minutes, 15 minutes, 30 minutes, 60 minutes, etc., to generate additional data sets from which number of consecutive instances of the first time window is selected in step 408 below.

Referring back again to FIG. 4, in step 408, a first number of consecutive instances of the first time window is determined based at least on an amount of change between first data values that are adjacent across the first data set. For example, consecutive instance determiner 218 is configured to determine number of consecutive instances of the time window of the different consecutive monitoring time windows (e.g., from 1 window, 2 windows, 3 windows, 4 windows, etc., as described above and as shown in FIGS. 5A-5D), in embodiments. Consecutive instance determiner 218 determines the number of consecutive instances of the time window based on amounts of change between adjacent data values. In the illustrated example for data set 600 in FIG. 6, a number of consecutive instances of the time window of 3 consecutive time windows is determined.

As shown in FIG. 6 and data set 600, the data value for a single consecutive time window drops significantly when two consecutive time windows are used (the value drops from 3.5 to 1.75). Again the data value drops going from two consecutive time windows to three consecutive time windows (the value drops from 1.75 to 0.85). However, when increasing the consecutive from three to four or more consecutive time windows per data set 600, the decrease in the data value for alerts only decreases by a relatively small amount. In other words, after the data value illustrated as a data value 606, the amount of change between adjacent data values is minimal, while the amount of change between prior adjacent data values is significant. Put another way, at data value 606, the slope of the curve that fits data set representation 602 begins to flatten and has a maximum amount of change in the first data set, meaning that there are not significant alert reductions after this point regardless of increasing the number of consecutive time windows, whereas before data value 606 the decrease in alerts was relatively large in number. Accordingly, as described above for step 408 of flowchart 400, consecutive instance determiner 218 determines that a number of consecutive instances of the time window of 3 consecutive time windows 604 is the initially optimal number of consecutive instances of the time window.

This idea is also illustrated in FIGS. 5A-5D which show plot 500A with many total values 506 for threshold metric condition 504 being met at a number of consecutive instances of the time window of 1 window, plot 500B with many (but significantly fewer than plot 500B) total values 508 for threshold metric condition 504 being met at a number of consecutive instances of the time window of 2 windows, plot 500C with only one total value 510 for threshold metric condition 504 being met at a number of consecutive instances of the time window of 3 windows, and plot 500D also with only one total value 512 for threshold metric condition 504 being met at a number of consecutive instances of the time window of 4 windows. That is, there is not a significant decrease in alerts that would be generated when the consecutive time windows increase from 3 to 4 windows.

In some embodiments, step 408 of flowchart 400 may also include adding another time window to the first number of consecutive instances of the first time window based at least on an absolute value of the amount of change between the first data values that are adjacent across the first data set being greater than, or greater than or equal to, a change threshold. Referring also to data set 600 in FIG. 6, the number of alerts for a number of consecutive instances of the time window of 2 windows may be initially determined because the rate of decrease in alerts with 3 consecutive time windows is less than that for 2 consecutive time windows. However, consecutive instance determiner 218 may be configured to finally determine the first number of consecutive instances of the first time window in step 408 as 3 consecutive time windows as the decrease in the amount of alerts from 2 consecutive time windows to 3 consecutive time windows has an absolute value that meets or exceeds a change threshold despite the decrease in the slope of the curve between the data values of 2 consecutive time windows and 3 consecutive time windows.

In FIG. 4, and step 410 of flowchart 400, the first number of consecutive instances of the first time window is selected as a monitoring interval for a metric corresponding to the operational metric data. For example, consecutive instance determiner 218 is configured to select the instance determined in step 408 of flowchart 400 over any other number of consecutive instances of time windows determined/generated in flowchart 400, for the same or for different time window durations. In some embodiments, the selection of the first number of consecutive instances of the first time window may be made responsive to an indication from a user, via a UI as described herein, of acceptance of the determined and/or default configuration settings. Additionally, validations may be performed for determined numbers of consecutive instances of the time window (e.g., as in step 408), prior to selections thereof, according to embodiments. As an example, and with reference to FIGS. 5A-5D, FIG. 5A expressly illustrates validation data 514 (i.e., test data) that is utilized to verify the determined number of consecutive instances of the time window (the preceding metric data may be referred to as training data and may be used in the steps of flowchart 400 described above). In embodiments where ML models are used to perform one or more steps of flowchart 400, validation is performed to confirm that the selection is optimal for all metric data and that the utilized model does not over-fit the metric data used for training. In some examples, validation may be performed using the same, or a different, threshold metric condition.

In a non-limiting, illustrative example implementation of flowchart 400, where the operational metric data used to determine the number of consecutive instances of the time window includes the 10 days of past data, validation operations may utilize 11 days of past data, where the oldest 10 days are used to determine a number of consecutive instances of the time window (a first portion of data), and the most recent day is used to validate the selection (a second portion of data), although any division into separate portions of past data may be used. The validation process may select a different number of consecutive instances of the time window (e.g., in the embodiments shown in FIGS. 5A-5D, validation may select the number of consecutive instances of the time window of 4 consecutive time windows). In such cases, the higher number of consecutives, either based on training data or on validation data, may be selected as the number of consecutive instances of the time window.

Referring now to FIG. 7 and data sets 700, a representation of a training data set 702 and a representation of a validation data set 704 are shown, according to an example embodiment. As noted above, ML models trained on training data may be validated based on a validation portion of the past metric data. In the illustrated example, a selection of a number of consecutive instances of the time window 706 of 5 consecutive time windows is determined for training data set 702, while a number of consecutive instances of the time window 708 of 4 consecutive time windows is determined for validation data set 704. According to embodiments, consecutive instance determiner 218 is configured to select the number of consecutive windows as the maximum between number of consecutive instances of the time window 706 and number of consecutive instances of the time window 708—here, number of consecutive instances of the time window 706 is selected by consecutive instance determiner 218. Additionally, it should be noted that the similarity between number of consecutive instances of the time window 706 and number of consecutive instances of the time window 708 serves as indicia of validation of the model used.

Again referring to FIG. 4, in step 412, the first number of consecutive instances of the first time window is applied, as a monitoring interval, to a system alert monitor that monitors the metric and that triggers system alerts based on the monitoring interval. For example, the instance determined and/or selected by consecutive instance determiner 218 in flowchart 400 is applied to a system alert monitor such as alert monitor 222 for monitoring of the metric during production or operation according to the monitoring interval, i.e., the number of consecutive instances of the time window. As an example, if the number of consecutive instances of the time window is determined to be 3, alert monitor 222 will trigger an alert if the threshold metric condition for the metric that is monitored is met in 3 consecutive time windows. In some embodiments, the application of the first number of consecutive instances of the time window to the system alert monitor may be made responsive to an indication from a user, via a UI as described herein, of acceptance of the determined and/or default configuration settings.

In FIG. 8, a block diagram of a user interface (UI) 800 for one click monitors in impact time detection for noise reduction in at-scale monitoring, according to an example embodiment. In embodiments, UI 800 is configured for user acceptance of configuration settings for a system alerts monitor, and includes one or more UI controls, elements, and/or objects that may be activated by a user, e.g., via a touch input, a mouse input, etc.

As exemplarily illustrated, UI 800 includes a first UI control 802, a second UI control 804, and a third UI control 806. First UI control 802, when activated by a user, indicates acceptance by the user to apply determined and/or default configurations settings, as described herein, to the system alerts monitor. As noted herein, scaled-out systems may include thousands, hundreds of thousands, or more, different metrics and combinations thereof for which system alert monitoring is desired. Activation of first UI control 802 enables a user, with a single "click," to configure these settings for monitoring such metrics, and without such an option, it would not be feasible, or even possible, for a user to configure such settings for monitoring. Second UI control 804 may allow a user to decline the determined and/or default settings, e.g., a user may manually configure a much reduced number of configuration settings, and third UI control 806 may allow a user to view a list recommended configuration settings.

In FIG. 9, a flowchart 900 for one click monitors in impact time detection for noise reduction in at-scale monitoring is shown, according to an example embodiment. System 100A in FIG. 1A, System 100B in FIG. 1B, and/or system 200 in FIG. 2 are configured to operate according to flowchart 900, which is an embodiment of flowchart 400 of FIG. 4. Further structural and operational examples will be apparent to persons skilled in the relevant art(s) based on the following descriptions. Flowchart 900 is described below with respect to system 200 of FIG. 2 and flowchart 400 of FIG. 4.

Flowchart 900 begins at step 902. In step 902, additional operational metric data that is associated with the metric in a time period subsequent to said applying is received from the system alert monitor. For instance, models and configuration settings for metrics monitored by a system alerts monitor may be updated, e.g., dynamically, after initial application such as in step 412 of flowchart 400 in FIG. 4 or after prior updating for the system alerts monitor. When additional operational metric data is acquired by a system alert monitor, such as alert monitor 222 of system 200 in FIG. 2, and/or when alerts for one or more metrics are too frequent or have times to detect that are too long, the additional operational metric data is provided to and received by alert manager 208 of system 200, as similarly described with respect to step 402 of flowchart 400.

In step 904, a second number of consecutive instances of a second time window from a different number consecutive instances of the second time window over a second portion of the time period is determined subsequent to said applying the first number of consecutive instances of the first time window and based at least on a second data set that is monotonically decreasing and that is associated with a second number of times the threshold metric condition is met by the additional operational metric data. For example, consecutive instance determiner 218 of system 200 in FIG. 2 is configured to determine an updated number of different consecutive monitoring time windows (e.g., as described above and as shown in step 408 of flowchart in FIG. 4 and in FIGS. 5A-5D), in embodiments. Consecutive instance determiner 218 determines the new number consecutive instances of the time windows based on amounts of change between adjacent data values in the additional operational metric data received in step 902.

In step 906, the second number of consecutive instances of the second time window is applied to the system alert monitor, as the monitoring interval, replacing the first number of consecutive instances of the first time window. For example, the number of consecutive instances of the second time window determined and/or selected by consecutive instance determiner 218 in step 904 is applied to a system alert monitor such as alert monitor 222 for monitoring of the metric during production or operation, which replaces the first number of consecutive instances of the first time window that was applied in step 412 of flowchart 400 in FIG. 4. In some embodiments, the application of the updated second number of consecutive instances of the second time window to the system alert monitor may be made responsive to an indication from a user, via a UI as described herein, of acceptance of the updated configuration settings.

Embodiments herein also provide for reversion to other, or prior, models when a generated or updated model determines a number of consecutive instances of the time window with high number of consecutive time windows such that the time to detect for alert triggering is longer than desired. In embodiments, acceptable times to detect may be determined based on IT personnel preference, end user preference, monitoring context, operational situations, time window duration, and/or the like. As a non-limiting example, a number of consecutive instances of the time window with 10 or more windows of 5 minute duration, may exceed the desired time to detect, while a number of consecutive instances of the time window with 5 or more windows of 60 minute duration, may exceed the desired time to detect.

In FIG. 10, a flowchart 1000 for one click monitors in impact time detection for noise reduction in at-scale monitoring is shown, according to an example embodiment. System 100A in FIG. 1A, System 100B in FIG. 1B, and/or system 200 in FIG. 2 are configured to operate according to flowchart 1000, which is an embodiment of flowchart 400 of FIG. 4. In embodiments, flowchart 1000 is performed subsequent to determining the first number of consecutive instances of the first time window in step 408 of flowchart 400 in FIG. 4 and prior to applying the first number of consecutive instances of the first time window in step 412 of flowchart 400. Further structural and operational examples will be apparent to persons skilled in the relevant art(s) based on the following descriptions. Flowchart 1000 is described below with respect to system 200 of FIG. 2 and flowchart 400 of FIG. 4.

Flowchart 1000 begins at step 1002. In step 1002, it is determined that a number of time windows having met the threshold metric condition in the first number of consecutive instances of the first time window meets a noise condition. For example, one or more of data set logic 216 or consecutive instance determiner 218 may be configured to detect and determine that the noise for a the first number of consecutive instances of the first time window of consecutive time windows is equally distributed over the training metric data across the time period which it spans. One example of this is when an alert is triggered each day based on application of the model. In other words, the monotonically decreasing data set is initially flattened, and a very high consecutive time window setting is thus needed to reduce the number alerts. Different scenarios may cause this equal distribution of noise, such as an ineffectively trained model, or a threshold metric condition or boundary that is not practical (e.g., a 5% CPU utilization threshold).

In step 1004, one or more time windows are added to the first number of consecutive instances of the first time window such that the noise condition is not met. For example, consecutive instance determiner 218 may be configured to change the determined number of consecutive instances from step 408 of flowchart 400 by adding one or more time windows to the number of time windows previously determined. This effectively determines a different number of consecutive instances of the first time window with a longer time to detect, according to embodiments. As a non-limiting example, an initially determined number of consecutive instances of the first time window may use a consecutive time window setting of 4 windows, while the different instance in step 1004 is determined to use a consecutive time window setting of 10, 13, etc., windows As another non-limiting example, consecutive instance determiner 218 forces the model to use number of consecutive instances of the first time window such that the sixtieth percentile of alerts each day is zero (e.g., 6 days out of the 10 day span of data should not have alerts triggered).

FIG. 11A, FIG. 11B, and FIG. 11C will now be described. In scenarios for which time windows with longer durations are utilized, there may be a small number, e.g., one or two data points for metric data, which are anomalous such that an alert would be triggered. These data points can be considered justified and should be considered as an alert. As an example, this scenario may present itself during the use of longer durations for monitoring time windows, e.g., a 60-minute duration for a monitoring time window, which is a more stable, or less noisy, duration, and in many cases, the alerts detected in model training are thus justified.

In the context of the embodiments herein, in an application of a single consecutive time window with a 60-minute duration, these justified alerts can be removed by increasing the number of consecutive instances of the first time window to 2 consecutive time windows to reduce the alerts triggered. However, this is not always a desired outcome as when alerts are justified, as in these examples here, false negatives are produced. Thus, additional consecutive time windows may be needed to prevent such undesired effects, however, this significantly increases the time to detect alerts for long window durations, e.g., 120 minutes or 240 minutes, instead of 60 minutes. To account for this issue, embodiments also contemplate the "weakening" of the model training to ignore two alerts, by way of example, and determine the number of consecutive instances of the time window for monitoring after this removal. Doing this allows for model generation that results in few consecutive time windows, and thus optimizes the monitoring interval for a time to detect the system alerts that are monitored by the system alert monitor, while still recognizing and allowing for justified alerts to be triggered. In some embodiments, ignoring a number of alerts in this manner may be performed when the window duration meets, or exceeds, a length of a predetermined duration, e.g., 15 minutes, 30 minutes, 60 minutes, and/or the like.

FIG. 11A, FIG. 11B, and FIG. 11C each show a graphical representation of system metric data for one click monitors in impact time detection for noise reduction in at-scale monitoring. In FIG. 11A, a plot 1100A is shown for a single consecutive time window with a 60-minute duration of the example above. Plot 1100A includes training metric data 1102, having an anomalous data point 1106, and testing metric data 1104, having an anomalous data point 1108. As noted above for such examples, anomalies in a stable, single consecutive time window with a 60-minute duration are often justified and should not be ignored.

In FIG. 11B, a plot 1100B is shown for a number of consecutive instances of the first time window having 4 windows and a 60-minute time window duration, continuing the example above. Plot 1100B includes training metric data 1110 and testing metric data 1112, which are illustrated as seasonal data, as well as a threshold metric condition 1114. There are no data points illustrated in plot 1100B as triggering an alert as models may be trained according to embodiments to increase the consecutive time windows used to reduce alerts. However, for stable time window durations like 60 minutes in which anomalous data points would justifiably trigger alerts, models may be trained against data sets that ignore, e.g., 2 alert conditions. In this way, the model may determine a single consecutive window instance for a 60-minute time window duration, while still being enabled to detect the anomalous data points as justified alerts.

For example, in FIG. 11C, a plot 1100C is shown for a consecutive time window instance having 1 window and a 60-minute time window duration, continuing the example above. Plot 1100C also includes training metric data 1110 and testing metric data 1112, as well as threshold metric condition 1114, as in plot 1100B. However, with a single consecutive time window applied for the model used in plot 1100C detects that the threshold metric condition is met (illustrated as gray circles) in training metric data 1110 and in testing metric data 1112: a value 1116 and a value 1118, respectively. Accordingly, a number of consecutive instances of the time window may be determined, e.g., by consecutive instance determiner 218 in FIG. 2, as a single window instance for longer duration time windows, in some embodiments.

III. Example Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including but not limited to, system 100A in FIG. 1A, system 100B in FIG. 1B, system 200 in FIG. 2, UI 800 of FIG. 8, along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), an application specific integrated circuit (ASIC), a trusted platform module (TPM), and/or the like. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

FIG. 12 depicts an exemplary implementation of a computing device 1200 in which embodiments may be implemented. For example, embodiments described herein may be implemented in one or more computing devices or systems similar to computing device 1200, or multiple instances of computing device 1200, in stationary or mobile computer embodiments, including one or more features of computing device 1200 and/or alternative features. The description of computing device 1200 provided herein is provided for purposes of illustration, and is not intended to be limiting. Embodiments may be implemented in further types of computer systems, servers, and/or clusters, etc., as would be known to persons skilled in the relevant art(s).

As shown in FIG. 12, computing device 1200 includes one or more processors, referred to as processor circuit 1202, a system memory 1204, and a bus 1206 that couples various system components including system memory 1204 to processor circuit 1202. Processor circuit 1202 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1202 may execute program code stored in a computer readable medium, such as program code of operating system 1230, application programs 1232, other programs 1234, etc. Bus 1206 represents one or more of any of several types of bus structures, including a memory bus or memory controller, a peripheral bus, an accelerated graphics port, and a processor or local bus using any of a variety of bus architectures. System memory 1204 includes read only memory (ROM) 1208 and random access memory (RAM) 1210. A basic input/output system 1212 (BIOS) is stored in ROM 1208.

Computing device 1200 also has one or more of the following drives: a hard disk drive 1214 for reading from and writing to a hard disk, a magnetic disk drive 1216 for reading from or writing to a removable magnetic disk 1218, and an optical disk drive 1220 for reading from or writing to a removable optical disk 1222 such as a CD ROM, DVD ROM, or other optical media. Hard disk drive 1214, magnetic disk drive 1216, and optical disk drive 1220 are connected to bus 1206 by a hard disk drive interface 1224, a magnetic disk drive interface 1226, and an optical drive interface 1228, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1230, one or more application programs 1232, other programs 1234, and program data 1236. Application programs 1232 or other programs 1234 may include, for example, computer program logic (e.g., computer program code or instructions) for implementing embodiments described herein, such as but not limited to system 100A in FIG. 1A, system 100B in FIG. 1B, system 200 in FIG. 2, UI 800 of FIG. 8, along with any components and/or subcomponents thereof, as well as the flowcharts/flow diagrams described herein, including portions thereof, and/or further examples described herein.

A user may enter commands and information into the computing device 1200 through input devices such as keyboard 1238 and pointing device 1240. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1202 through a serial port interface 1242 that is coupled to bus 1206, but may be connected by other interfaces, such as a parallel port, game port, or a universal serial bus (USB).

A display screen 1244 is also connected to bus 1206 via an interface, such as a video adapter 1246. Display screen 1244 may be external to, or incorporated in computing device 1200. Display screen 1244 may display information, as well as being a user interface for receiving user commands and/or other information (e.g., by touch, finger gestures, virtual keyboard, etc.). In addition to display screen 1244, computing device 1200 may include other peripheral output devices (not shown) such as speakers and printers.

Computing device 1200 is connected to a network 1248 (e.g., the Internet) through an adaptor or network interface 1250, a modem 1252, or other means for establishing communications over the network. Modem 1252, which may be internal or external, may be connected to bus 1206 via serial port interface 1242, as shown in FIG. 12, or may be connected to bus 1206 using another interface type, including a parallel interface.

TPM 1254 may be connected to bus 1206, and may be an embodiment of any TPM, as would be understood by one of skill in the relevant art(s) having the benefit of this disclosure. For example, TPM 1254 may be configured to perform one or more functions or operations of TPMs for various embodiments herein.

As used herein, the terms "computer program medium," "computer-readable medium," "computer-readable storage medium," and "computer-readable storage device," etc., are used to refer to physical hardware media. Examples of such physical hardware media include the hard disk associated with hard disk drive 1214, removable magnetic disk 1218, removable optical disk 1222, other physical hardware media such as RAMs, ROMs, flash memory cards, digital video disks, zip disks, MEMs, nanotechnology-based storage devices, and further types of physical/tangible hardware storage media (including memory 1220 of FIG. 12). Such computer-readable media and/or storage media (e.g., computer-readable storage medium) are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1232 and other programs 1234) may be stored on the hard disk, magnetic disk, optical disk, ROM, RAM, or other hardware storage medium. Such computer programs may also be received via network interface 1250, serial port interface 1242, or any other interface type. Such computer programs, when executed or loaded by an application, enable computing device 1200 to implement features of embodiments discussed herein. Accordingly, such computer programs represent controllers of the computing device 1200.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Examples and Advantages

As described, systems and devices embodying the techniques herein may be configured and enabled in various ways to perform their respective functions for one click monitors in impact time detection for noise reduction in at-scale monitoring. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

As described herein, systems, devices, components, etc., of the embodiments that are configured to perform functions and/or operations are also contemplated as performing such functions and/or operations.

According to the described embodiments for one click monitors in impact time detection for noise reduction in at-scale monitoring, an alert manager associated with a system alert monitor is enabled to determine and recommend configuration settings for monitoring any number of metrics, or combinations thereof, during system operation, and enables an end user to accept the determined configuration settings via single UI control, even in at-scale systems with otherwise unmanageable numbers of configuration settings for metrics to be monitored.

The embodiments herein provide for increased accuracy of alert detection with reduced times to detect network issues associated with the alerts. Implementation and deployment efficiencies are also increased by the one-click application of configuration settings to a system alert monitor. This in turn provides improved overall system operations and efficiencies, including less down time and faster diagnoses of issues.

The embodiments herein utilize uniquely trained models and scalable management of configuration settings, and provide for dynamically modifying/updating models for configuration settings based on operational/production metric data to improve issue detection accuracy, while also providing optimal times to detect such issues for the increased accuracy, that were previously not available for software-based services, much less for the specific embodiments described herein. The described embodiments are also adaptable to implementations of scaled-out microservices which provides system-wide flexibility for monitoring operational metrics.

The additional examples and embodiments described in this Section may be applicable to examples disclosed in any other Section or subsection of this disclosure.

Embodiments in this description provide for systems, devices, and methods for one click monitors in impact time detection for noise reduction in at-scale monitoring. For example, a method performed by computing device is described herein for performing such embodiments. The method includes receiving a threshold metric condition, and operational metric data, associated with a past time period, of a metric, and performing a threshold determination, based on a first time window defined by a first length, that includes, for each of a different number of consecutive instances of the first time window over a first portion of the past time period, determining a first data value that corresponds to a first number of times the threshold metric condition is met by the operational metric data in the number of consecutive instances of the first time window. The method also includes generating a first data set that is monotonically decreasing and that includes a portion of the first data values, determining, based at least on an amount of change between first data values that are adjacent across the first data set, a first number of consecutive instances of the first time window, and applying the first number of consecutive instances of the first time window, as a monitoring interval, to a system alert monitor that monitors the metric and that triggers system alerts based on the monitoring interval.

In an embodiment, the method includes, prior to applying, performing a second threshold determination, based on a second time window that is defined by a second length, that includes, for each of a different number of consecutive instances of the second time window over the first portion of the past time period, determining a second data value that corresponds to a second number of times the threshold metric condition is met by the operational metric data in the number of consecutive instances of the second time window, generating a second data set that is monotonically decreasing and that includes a portion of the second data values, determining, based at least on an amount of change between second data values that are adjacent across the second data set, a second number of consecutive instances of the second time window, and selecting the first number of consecutive instances of the first time window as the monitoring interval based at least on a first total amount of time of the first number of consecutive instances of the first time window being less than, or less than or equal to, a second total amount of time of the second number of consecutive instances of the second time window.

In an embodiment, the method includes receiving, prior to said applying, a user input accepting the first number of consecutive instances of the first time window that was determined and a plurality of other numbers of consecutive instances of other time windows, respectively corresponding to other metrics, that are determined based at least on data sets therefor that are monotonically decreasing and that are determined via corresponding threshold determinations, where applying includes applying each of the plurality of other numbers of consecutive instances of other time windows, as other monitoring intervals, to the system alert monitor that monitors the other metrics and that triggers other system alerts based on the other monitoring intervals.

In an embodiment of the method, the first data values are associated with alerts, and the amount of change between first data values that are adjacent across the first data set corresponds to a maximum amount of change in the first data set.

In an embodiment of the method, determining, based at least on the amount of change between the first data values that are adjacent across the first data set, the first number of consecutive instances of the first time window includes adding another time window to the first number of consecutive instances of the first time window based at least on an absolute value of the amount of change between the first data values that are adjacent across the first data set being greater than, or greater than or equal to, a change threshold.

In an embodiment, the method includes, subsequent to determining the first number of consecutive instances of the first time window and prior to applying, determining that a number of time windows having met the threshold metric condition in the first number of consecutive instances of the first time window meets a noise condition, and adding one or more time windows to the first number of consecutive instances of the first time window such that the noise condition is not met.

In an embodiment of the method, the first length meets or exceeds a predetermined duration, and generating the first data set that is monotonically decreasing and that includes the portion of the first data values comprises excluding at least one of the first data values from the first data set that optimizes the monitoring interval for a time to detect the system alerts that are monitored by the system alert monitor.

In an embodiment, the method includes, subsequent to determining the first number of consecutive instances of the first time window and prior to applying, validating the first number of consecutive instances of the first time window by performing the threshold determination, based on the first time window, that includes, for each of a different number of consecutive instances of the first time window over a second portion of the past time period, determining a validation data value that corresponds to a second number of times the threshold metric condition is met by the operational metric data in the number of consecutive instances of the first time window, generating a validation data set that is monotonically decreasing and that includes a portion of the validation data values, determining, based at least on an amount of change between validation data values that are adjacent across the validation data set, a validation number of the consecutive instances of the first time window, and validating the first number of consecutive instances of the first time window against the validation number of the consecutive instances of the first time window.

A system is also described herein. The system may be configured and enabled in various ways for one click monitors in impact time detection for noise reduction in at-scale monitoring, as described herein. In an embodiment, the system includes a memory that stores program instructions, and a processing system configured to execute the program instructions. The program instructions include performing a threshold determination, based on a first time window defined by a first length, that includes, for each of a different number of consecutive instances of the first time window over a first portion of the past time period, determining a first data value that corresponds to a first number of times a threshold metric condition, that is received by the system, is met by operational metric data for a metric that associated with a past time period and that is also received by the system, in the number of consecutive instance of the first time window. The program instructions also include generating a first data set that is monotonically decreasing and that includes a portion of the first data values, determining, based at least on an amount of change between first data values that are adjacent across the first data set, a first number of consecutive instances of the first time window, and applying the first number of consecutive instances of the first time window, as a monitoring interval, to a system alert monitor that monitors the metric and that triggers system alerts based on the monitoring interval.

In an embodiment of the system, the program instructions include, prior to applying, performing a second threshold determination, based on a second time window that is defined by a second length, that includes, for each of a different number of consecutive instances of the second time window over the first portion of the past time period, determining a second data value that corresponds to a second number of times the threshold metric condition is met by the operational metric data in the number of consecutive instances of the second time window, generating a second data set that is monotonically decreasing and that includes a portion of the second data values, determining, based at least on an amount of change between second data values that are adjacent across the second data set, a second number of consecutive instances of the second time window, and selecting the first number of consecutive instances of the first time window as the monitoring interval based at least on a first total amount of time of the first number of consecutive instances of the first time window being less than, or less than or equal to, a second total amount of time of the second number of consecutive instances of the second time window.

In an embodiment of the system, the first data values are associated with alerts, and the amount of change between first data values that are adjacent across the first data set corresponds to a maximum amount of change in the first data set.

In an embodiment of the system, determining, based at least on the amount of change between the first data values that are adjacent across the first data set, the first number of consecutive instances of the first time window includes adding another time window to the first number of consecutive instances of the first time window based at least on an absolute value of the amount of change between the first data values that are adjacent across the first data set being greater than, or greater than or equal to, a change threshold.

In an embodiment of the system, the program instructions further include, subsequent to determining the first instance and prior to applying the first instance, determining that a number of time windows having met the threshold metric condition in the first number of consecutive instances of the first time window meets a noise condition, and adding one or more time windows to the first number of consecutive instances of the first time window such that the noise condition is not met.

In an embodiment of the system, the first length meets or exceeds a predetermined duration, and generating the first data set that is monotonically decreasing and that includes the portion of the first data values comprises excluding at least one of the first data values from the first data set that optimizes the monitoring interval for a time to detect the system alerts that are monitored by the system alert monitor.

In an embodiment of the system, the program instructions further include, subsequent to determining the first number of consecutive instances of the first time window and prior to applying, validating the first number of consecutive instances of the first time window by performing the threshold determination, based on the first time window, that includes, for each of a different number of consecutive instances of the first time window over a second portion of the past time period, determining a validation data value that corresponds to a second number of times the threshold metric condition is met by the operational metric data in the number of consecutive instances of the first time window, generating a validation data set that is monotonically decreasing and that includes a portion of the validation data values, determining, based at least on an amount of change between validation data values that are adjacent across the validation data set, a validation number of the consecutive instances of the first time window, and validating the first number of consecutive instances of the first time window against the validation number of the consecutive instances of the first time window.

In an embodiment of the system, validating the first number of consecutive instances of the first time window against the validation number of consecutive instances of the first time window includes at least one of selecting the first number of consecutive instances of the first time window as the monitoring interval based at least on a correlation between the first number of consecutive instances of the first time window and the validation number of consecutive instances of the first time window, wherein the first number of consecutive instances of the first time window includes a greater number of first time windows than the validation number of consecutive instances of the first time window, or selecting the validation number of consecutive instances of the first time window as the first number of consecutive instances of the first time window for the monitoring interval based at least on a correlation between the first number of consecutive instances of the first time window and the validation number of consecutive instances of the first time window, wherein the first number of consecutive instances of the first time window includes a lesser number of first time windows than the validation number of consecutive instances of the first time window.

A computer-readable storage medium having program instructions recorded thereon that, when executed by a processing system, perform a method, is also described. The method and program instructions are for one click monitors in impact time detection for noise reduction in at-scale monitoring, as described herein. The program instructions include receiving a threshold metric condition, and operational metric data, associated with a past time period, of a metric, performing a threshold determination, based on a first time window defined by a first length, that includes, for each of a different number of consecutive instances of the first time window over a first portion of the past time period, determining a first data value that corresponds to a first number of times the threshold metric condition is met by the operational metric data in the number of consecutive instances of the first time window. The program instructions also include generating a first data set that is monotonically decreasing and that includes a portion of the first data values, determining, based at least on an amount of change between first data values that are adjacent across the first data set, a first number of consecutive instances of the first time window, and applying the first number of consecutive instances of the first time window, as a monitoring interval, to a system alert monitor that monitors the metric and that triggers system alerts based on the monitoring interval.

In an embodiment of the computer-readable storage medium, the program instructions include receiving, prior to applying, a user input accepting the first number of consecutive instances of the first time window that was determined and a plurality of other numbers of consecutive instances of other time windows, respectively corresponding to other metrics, that are determined based at least on data sets therefor that are monotonically decreasing and that are determined via corresponding threshold determinations, and applying includes applying each of the plurality of other numbers of consecutive instances of other time windows, as other monitoring intervals, to the system alert monitor that monitors the other metrics and that triggers other system alerts based on the other monitoring intervals.

In an embodiment of the computer-readable storage medium, the program instructions include receiving, from the system alert monitor, additional operational metric data that is associated with the metric in a time period subsequent to said applying the first number of consecutive instances of the first time window, determining, based at least on a second data set that is monotonically decreasing and that is associated with a second number of times the threshold metric condition is met by the additional operational metric data, a second number of consecutive instances of a second time window from a different number consecutive instances of the second time window over a second portion of the time period subsequent to said applying the first number of consecutive instances of the first time window, and applying the second number of consecutive instances of the second time window to the system alert monitor, as the monitoring interval, replacing the first number of consecutive instances of the first time window. In a further embodiment of the computer-readable storage medium, the second time window comprises a same duration as the first time window and the second number of consecutive instances of the second time window comprises a total amount of time greater than the first number of consecutive instances of the first time window.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A method performed by a computing system, the method comprising:
receiving a threshold metric condition, and operational metric data, associated with a past time period, of a metric;
performing a threshold determination, based on a first time window defined by a first length, that includes, for each of a different number of consecutive instances of the first time window over a first portion of the past time period:
determining a first data value that corresponds to a first number of times the threshold metric condition is met by the operational metric data in the number of consecutive instances of the first time window;
generating a first data set that is monotonically decreasing and that includes a portion of the first data values;
determining, based at least on an amount of change between first data values that are adjacent across the first data set, a first number of consecutive instances of the first time window;
applying the first number of consecutive instances of the first time window, as a monitoring interval, to a system alert monitor that monitors the metric and that triggers system alerts based on the monitoring interval; and
triggering, by the system alert monitor, a system alert based at least on the threshold metric condition being met for the metric during monitoring over a current period of the monitor interval.

2. The method of claim 1, further comprising, prior to said applying:
performing a second threshold determination, based on a second time window that is defined by a second length, that includes, for each of a different number of consecutive instances of the second time window over the first portion of the past time period:
determining a second data value that corresponds to a second number of times the threshold metric condition is met by the operational metric data in the number of consecutive instances of the second time window;
generating a second data set that is monotonically decreasing and that includes a portion of the second data values;
determining, based at least on an amount of change between second data values that are adjacent across the second data set, a second number of consecutive instances of the second time window; and
selecting the first number of consecutive instances of the first time window as the monitoring interval based at least on a first total amount of time of the first number of consecutive instances of the first time window being less than, or less than or equal to, a second total amount of time of the second number of consecutive instances of the second time window.

3. The method of claim 1, further comprising:
receiving, prior to said applying, a user input accepting:
the first number of consecutive instances of the first time window that was determined, and
a plurality of other numbers of consecutive instances of other time windows, respectively corresponding to other metrics, that are determined based at least on data sets therefor that are monotonically decreasing and that are determined via corresponding threshold determinations;
wherein said applying includes applying each of the plurality of other numbers of consecutive instances of other time windows, as other monitoring intervals, to the system alert monitor that monitors the other metrics and that triggers other system alerts based on the other monitoring intervals.

4. The method of claim 1, wherein the first data values are associated with alerts; and
wherein the amount of change between first data values that are adjacent across the first data set corresponds to a maximum amount of change in the first data set.

5. The method of claim 1, wherein said determining, based at least on the amount of change between the first data values that are adjacent across the first data set, the first number of consecutive instances of the first time window comprises:
adding another time window to the first number of consecutive instances of the first time window based at least on an absolute value of the amount of change between the first data values that are adjacent across the first data set being greater than, or greater than or equal to, a change threshold.

6. The method of claim 1, further comprising subsequent to said determining the first number of consecutive instances of the first time window and prior to said applying:
determining that a number of time windows having met the threshold metric condition in the first number of consecutive instances of the first time window meets a noise condition; and
adding one or more time windows to the first number of consecutive instances of the first time window such that the noise condition is not met.

7. The method of claim 1, wherein the first length meets or exceeds a predetermined duration; and
wherein said generating the first data set that is monotonically decreasing and that includes the portion of the first data values comprises excluding at least one of the first data values from the first data set that optimizes the monitoring interval for a time to detect the system alerts that are monitored by the system alert monitor.

8. The method of claim 1, further comprising, subsequent to said determining the first number of consecutive instances of the first time window and prior to said applying, validating the first number of consecutive instances of the first time window by:
performing the threshold determination, based on the first time window, that includes, for each of a different number of consecutive instances of the first time window over a second portion of the past time period:
determining a validation data value that corresponds to a second number of times the threshold metric condition is met by the operational metric data in the number of consecutive instances of the first time window;
generating a validation data set that is monotonically decreasing and that includes a portion of the validation data values;
determining, based at least on an amount of change between validation data values that are adjacent across the validation data set, a validation number of the consecutive instances of the first time window; and
validating the first number of consecutive instances of the first time window against the validation number of the consecutive instances of the first time window.

9. A system that comprises:
a memory that stores program instructions; and
a processing system configured to execute the program instructions, the program instructions comprising:
performing a threshold determination, based on a first time window defined by a first length, that includes, for each of a different number of consecutive instances of the first time window over a first portion of the past time period:
determining a first data value that corresponds to a first number of times a threshold metric condition, that is received by the system, is met by operational metric data for a metric that associated with a past time period and that is also received by the system, in the number of consecutive instance of the first time window;
generating a first data set that is monotonically decreasing and that includes a portion of the first data values;
determining, based at least on an amount of change between first data values that are adjacent across the first data set, a first number of consecutive instances of the first time window;
applying the first number of consecutive instances of the first time window, as a monitoring interval, to a system alert monitor that monitors the metric and that triggers system alerts based on the monitoring interval; and
triggering, by the system alert monitor, a system alert based at least on the threshold metric condition being met for the metric during monitoring over a current period of the monitor interval.

10. The system of claim 9, wherein the program instructions further comprise, prior to said applying:
performing a second threshold determination, based on a second time window that is defined by a second length, that includes, for each of a different number of consecutive instances of the second time window over the first portion of the past time period:
determining a second data value that corresponds to a second number of times the threshold metric condition is met by the operational metric data in the number of consecutive instances of the second time window;
generating a second data set that is monotonically decreasing and that includes a portion of the second data values;
determining, based at least on an amount of change between second data values that are adjacent across the second data set, a second number of consecutive instances of the second time window; and
selecting the first number of consecutive instances of the first time window as the monitoring interval based at least on a first total amount of time of the first number of consecutive instances of the first time window being less than, or less than or equal to, a second total amount of time of the second number of consecutive instances of the second time window.

11. The system of claim 9, wherein the first data values are associated with alerts; and
wherein the amount of change between first data values that are adjacent across the first data set corresponds to a maximum amount of change in the first data set.

12. The system of claim 9, wherein said determining, based at least on the amount of change between the first data values that are adjacent across the first data set, the first number of consecutive instances of the first time window comprises:
adding another time window to the first number of consecutive instances of the first time window based at least on an absolute value of the amount of change between the first data values that are adjacent across the first data set being greater than, or greater than or equal to, a change threshold.

13. The system of claim 9, wherein the program instructions further comprise, subsequent to said determining the first instance and prior to said applying the first instance:
determining that a number of time windows having met the threshold metric condition in the first number of consecutive instances of the first time window meets a noise condition; and
adding one or more time windows to the first number of consecutive instances of the first time window such that the noise condition is not met.

14. The system of claim 9, wherein the first length meets or exceeds a predetermined duration; and
wherein said generating the first data set that is monotonically decreasing and that includes the portion of the first data values comprises excluding at least one of the first data values from the first data set that optimizes the monitoring interval for a time to detect the system alerts that are monitored by the system alert monitor.

15. The system of claim 9, wherein the program instructions further comprise, subsequent to said determining the first number of consecutive instances of the first time window and prior to said applying, validating the first number of consecutive instances of the first time window by:
performing the threshold determination, based on the first time window, that includes, for each of a different number of consecutive instances of the first time window over a second portion of the past time period:
determining a validation data value that corresponds to a second number of times the threshold metric condition is met by the operational metric data in the number of consecutive instances of the first time window;

generating a validation data set that is monotonically decreasing and that includes a portion of the validation data values;

determining, based at least on an amount of change between validation data values that are adjacent across the validation data set, a validation number of the consecutive instances of the first time window; and validating the first number of consecutive instances of the first time window against the validation number of the consecutive instances of the first time window.

16. The system of claim 15, wherein validating the first number of consecutive instances of the first time window against the validation number of consecutive instances of the first time window includes at least one of:

selecting the first number of consecutive instances of the first time window as the monitoring interval based at least on a correlation between the first number of consecutive instances of the first time window and the validation number of consecutive instances of the first time window, wherein the first number of consecutive instances of the first time window includes a greater number of first time windows than the validation number of consecutive instances of the first time window; or selecting the validation number of consecutive instances of the first time window as the first number of consecutive instances of the first time window for the monitoring interval based at least on a correlation between the first number of consecutive instances of the first time window and the validation number of consecutive instances of the first time window, wherein the first number of consecutive instances of the first time window includes a lesser number of first time windows than the validation number of consecutive instances of the first time window.

17. A computer-readable storage medium having program instructions recorded thereon that, when executed by a processing system, perform a method, the program instructions comprising:

receiving a threshold metric condition, and operational metric data, associated with a past time period, of a metric;

performing a threshold determination, based on a first time window defined by a first length, that includes, for each of a different number of consecutive instances of the first time window over a first portion of the past time period:

determining a first data value that corresponds to a first number of times the threshold metric condition is met by the operational metric data in the number of consecutive instances of the first time window;

generating a first data set that is monotonically decreasing and that includes a portion of the first data values;

determining, based at least on an amount of change between first data values that are adjacent across the first data set, a first number of consecutive instances of the first time window;

applying the first number of consecutive instances of the first time window, as a monitoring interval, to a system alert monitor that monitors the metric and that triggers system alerts based on the monitoring interval; and triggering, by the system alert monitor, a system alert based at least on the threshold metric condition being met for the metric during monitoring over a current period of the monitor interval.

18. The computer-readable storage medium of claim 17, wherein the program instructions comprise:

receiving, prior to said applying, a user input accepting:
the first number of consecutive instances of the first time window that was determined, and
a plurality of other numbers of consecutive instances of other time windows, respectively corresponding to other metrics, that are determined based at least on data sets therefor that are monotonically decreasing and that are determined via corresponding threshold determinations;

wherein said applying includes applying each of the plurality of other numbers of consecutive instances of other time windows, as other monitoring intervals, to the system alert monitor that monitors the other metrics and that triggers other system alerts based on the other monitoring intervals.

19. The computer-readable storage medium of claim 17, wherein the program instructions comprise:

receiving, from the system alert monitor, additional operational metric data that is associated with the metric in a time period subsequent to said applying the first number of consecutive instances of the first time window;

determining, based at least on a second data set that is monotonically decreasing and that is associated with a second number of times the threshold metric condition is met by the additional operational metric data, a second number of consecutive instances of a second time window from a different number consecutive instances of the second time window over a second portion of the time period subsequent to said applying the first number of consecutive instances of the first time window; and applying the second number of consecutive instances of the second time window to the system alert monitor, as the monitoring interval, replacing the first number of consecutive instances of the first time window.

20. The computer-readable storage medium of claim 19, wherein the second time window comprises a same duration as the first time window and the second number of consecutive instances of the second time window comprises a total amount of time greater than the first number of consecutive instances of the first time window.

* * * * *